(12) United States Patent
Ginetti

(10) Patent No.: US 12,367,335 B1
(45) Date of Patent: Jul. 22, 2025

(54) METHOD AND SYSTEM TO FACILITATE REVIEW OF SCHEMATICS FOR AN ELECTRONIC DESIGN

(71) Applicant: Cadence Design Systems, Inc., San Jose, CA (US)

(72) Inventor: Arnold Ginetti, Antibes (FR)

(73) Assignee: Cadence Design Systems, Inc., San Jose, CA (US)

( * ) Notice: Subject to any disclaimer, the term of this patent is extended or adjusted under 35 U.S.C. 154(b) by 404 days.

(21) Appl. No.: 17/809,899

(22) Filed: Jun. 30, 2022

(51) Int. Cl.
*G06F 30/398* (2020.01)
*G06F 30/12* (2020.01)

(52) U.S. Cl.
CPC ............ *G06F 30/398* (2020.01); *G06F 30/12* (2020.01)

(58) Field of Classification Search
CPC .................................................... G06F 30/398
USPC ......................................................... 716/111
See application file for complete search history.

(56) References Cited

U.S. PATENT DOCUMENTS

| | | | | |
|---|---|---|---|---|
| 10,783,292 | B1 * | 9/2020 | Clewes | G06F 30/394 |
| 2011/0107281 | A1 * | 5/2011 | Sun | G06F 30/398 716/139 |

OTHER PUBLICATIONS

Cadence, Cadence SiP Design, Connectivity-driven co-design and implementation of full system in package, Date identified for the document is from google.com is Jan. 2017.
Cadence, Orcad Capture, User's Guide, Second Edition, Dated May 2000.
Cadence, Lef/Def Language Reference, Product Version 5.7, Dated Nov. 2009.
Cadence Virtuoso Tutorial, Version 6.1, University of Southern California, EE209—Fall 2015, Last updated Oct. 2015.
Cadence, User's Guide for Virtuoso® Analog Design Environment, Product Version 5.1.41, Dated Sep. 2006.
Altium, "Differences", Altium Documentation, Dated Jul. 2020.
Mitchell, B., "Novation Circuit Tracks vs Circuit—Worth The Upgrade?", URL:https://wavelength.focuscamera.com/novation-circuit-worth-the-upgrade/, Dated Apr. 2021.
Glitch, D., "Review: Novation's Circuit Tracks is an even better Circuit groovebox" URL: https://djtechtools.com/2021/05/27/review-novations-circuit-tracks-is-an-even-better-circuit-groovebox/, Date identified for the document from google.com is May 2021.
Jiang, J. et al., "Engineering Change Order for Combinational and Sequential Design Rectification", Design, Automation And Test in Europe (DATE 2020), Dated 2020.
Krishnegowda, D., "A primer on engineering change order (ECO) using Conformal", EDN, Design, IC Designer's Corner, Dated Nov. 2021.
Xilinx, Vivado Design Suite User Guide, Design Flows Overview, Vivado Design Suite, UG892 (v2022.1), Dated Apr. 2022.

(Continued)

*Primary Examiner* — Eric D Lee
(74) *Attorney, Agent, or Firm* — Vista IP Law Group, LLP

(57) ABSTRACT

Disclosed is an improved approach to identify and visualize relevant changes that are made between an earlier schematic and an updated schematic. Both the old schematic and the updated schematic are presented into separate interface windows in conjunction with the layout design. Any changes between the schematics that are pertinent to the electronic design can be highlighted within the interface windows to permit the layout designer to properly appreciate any changes that are relevant to the layout.

21 Claims, 27 Drawing Sheets

(56) References Cited

OTHER PUBLICATIONS

Aras, User's Guide for Aras Innovator Product Engineering 14, Document #: 14.0.02021061201, dated Oct. 2021.
Mentor Graphics, PADS Layout Tutorial, Date identified for the document from google.com is Aug. 2017.
Non-Final Office Action for related U.S. Appl. No. 17/809,898 dated Mar. 21, 2025.

* cited by examiner

METHOD AND SYSTEM TO FACILITATE REVIEW OF SCHEMATICS FOR AN ELECTRONIC DESIGN

FIELD

The invention relates to the implementation of electronic designs, such as the design of Integrated Circuits (ICs).

BACKGROUND

A semiconductor integrated circuit has a large number of electronic components, such as transistors, logic gates, diodes, wires, etc., that are fabricated by forming layers of different materials and of different geometric shapes on various regions of a silicon wafer. A "schematic" is often used to provide a map or diagram of the circuitry for the integrated circuit. The schematic will typically use a presentation of standardized symbols to represent the components and interconnections in the circuit design. It is important to understand, however, that the pictorial presentation of the symbolic elements within the schematic does not necessarily represent or correspond to the exact arrangement of the physical shapes of the final circuit product embodied as the integrated circuit. Instead, during the design process, the schematic will be converted into a physical layout that corresponds to the physical location and placement of the geometric shapes that would implement the circuitry elements represented in the schematic. While the schematic designer may include the set of devices and interconnects that are needed for the design within the schematic, it is often up to a layout designer to transform that schematic into the specific placement of the physical geometric shapes at the appropriate locations on the physical substrate(s) to realize the intended circuitry in a manner that would function as desired without incurring any manufacturing-related errors (such as shorts, opens, or unintentional electrical interference between components).

During the sequence of workflow actions that are taken to form and finalize the electronic design, it is often the case that a designer will need to revise or edit the design. For example, an ECO (engineering change order) is a term that refers to a formal process of initiating an alteration or change to a design after an initial design phase has already been completed. In the field of electronic design, the ECO may be issued after the initial design phase has already resulted in the completion of an initial schematic that has been successfully transformed into a layout that is LVS (layout versus schematic) correct. The ECO may result in the creation of a modified schematic that changes some aspect of the original schematic.

When the revised schematic is passed from the schematic designer to the layout designer, it is often very helpful for the layout designer to be able to visually see and understand the distinctive changes that have occurred between the earlier version of the schematic and the later version of the schematic, especially as these schematic changes relate to the layout. By way of an analogy, this is somewhat similar to the way in which multiple editors of a text document may find it helpful to turn on "Track Changes" to comprehend the scope and extent of changes by different editors to the same text document.

The problem addressed by this disclosure is that conventional electronic design tools do not provide a comprehensively effective or efficient approach to identify and visualize the most relevant changes between a first earlier schematic and a second updated schematic. The most straightforward approach to identify changes between two schematics is to perform a simple DIFF operation between the schematics, where a report is generated for every single change between the old and new schematics based upon a review of the schematic design files in the design database. The issue with this simplistic approach is that certain types of changes may be non-substantive in nature and will not create true changes to the design (e.g., changes to connectivity), and thus their inclusion on a report of schematic changes to a layout designer is essentially a "false positive". On the other hand, there are other types of substantive changes that cannot be truly appreciated in their scope by merely looking at the schematic file by itself, and thus failure to report these types of changes may result in a "false negative" situation. The existence of either false positives and/or false negatives in such a report could be detrimental to the ability of the layout designer to accurately and timely generate an error-free layout for the electronic design.

Therefore, there is a need for an improved approach to facilitate the design of electronic circuits, particularly with respect to changes that are made to a schematic for the electronic design.

SUMMARY

Embodiments of the invention provide an improved approach to identify and visualize relevant changes that are made between an earlier schematic and an updated schematic. This is accomplished by presenting both the old schematic and the updated schematic into separate interface windows in conjunction with the layout design. Any changes between the schematics that are pertinent to the electronic design can be highlighted within the interface windows to permit the layout designer to properly appreciate any changes that are relevant to the layout.

Other and additional objects, features, and advantages of the invention are described in the detailed description, figures, and claims.

BRIEF DESCRIPTION OF FIGURES

The drawings illustrate the design and utility of some embodiments of the present invention. It should be noted that the figures are not drawn to scale and that elements of similar structures or functions are represented by like reference numerals throughout the figures. In order to better appreciate how to obtain the above-recited and other advantages and objects of various embodiments of the invention, a more detailed description of the present inventions briefly described above will be rendered by reference to specific embodiments thereof, which are illustrated in the accompanying drawings. Understanding that these drawings depict only typical embodiments of the invention and are not therefore to be considered limiting of its scope, the invention will be described and explained with additional specificity and detail through the use of the accompanying drawings in which.

DETAILED DESCRIPTION

Various embodiments will now be described in detail, which are provided as illustrative examples of the invention so as to enable those skilled in the art to practice the invention. Notably, the figures and the examples below are not meant to limit the scope of the present invention. Where certain elements of the present invention may be partially or fully implemented using known components (or methods or processes), only those portions of such known components (or methods or processes) that are necessary for an understanding of the present invention will be described, and the detailed descriptions of other portions of such known components (or methods or processes) will be omitted so as not to obscure the invention. Further, various embodiments encompass present and future known equivalents to the components referred to herein by way of illustration.

Embodiments of the invention provide an improved approach to identify and visualize relevant changes that are made between an earlier schematic and an updated schematic. This is accomplished by presenting both the old schematic and the updated schematic into separate interface windows in conjunction with the layout design. Any changes between the schematics that are pertinent to the electronic design can be highlighted within the interface windows to permit the layout designer to properly appreciate changes that are relevant to the layout.

Figure 1:
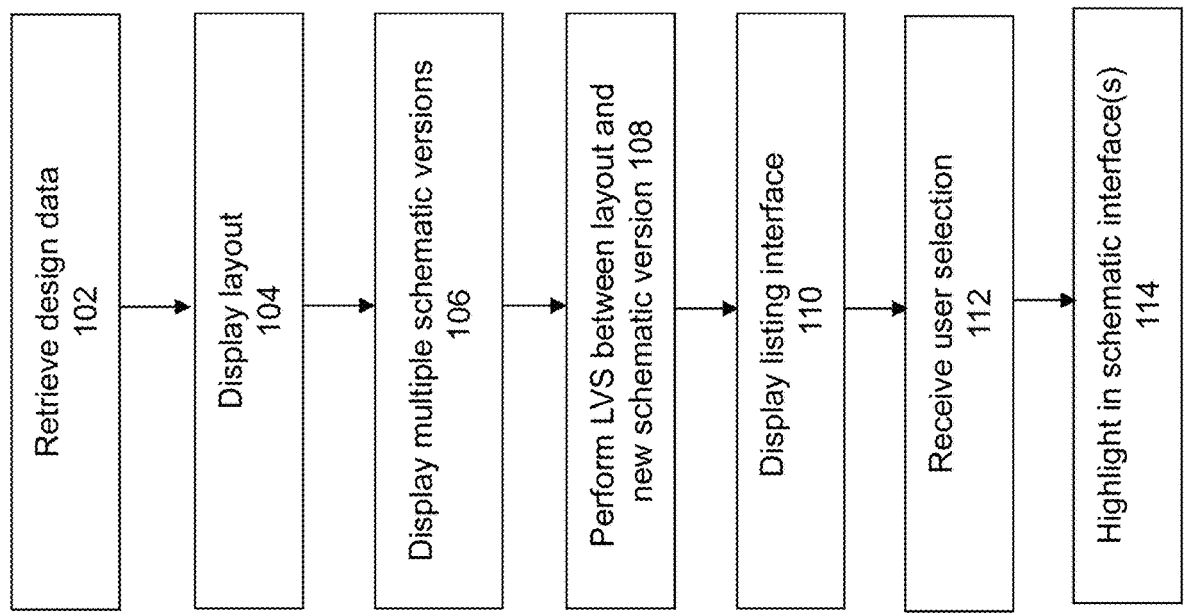
FIG. 1 shows a high-level flowchart of some embodiments of the invention.

FIG. 1 shows a flowchart of some embodiments of the invention. At 102, design data is accessed by the computing system. The electronic design process may involve the creation of one or more design specifications at a very high level of abstraction. For example, the design specification 100 may correspond to a behaviorial description of the intended functions of the electronic design, as well as specifications pertaining to performance, cost, size, interface, and/or power requirements. A schematic designer may use the design specification to create a schematic representation of the electronic design. The schematic may include a symbolic representation of the circuit components and interconnections for the design, as well as information about circuit primitives such as transistors and diodes, their sizes and interconnections, for example, resulting in netlists at various abstraction and hierarchical levels. A layout designer may then use the schematic to create a layout representation for the electronic design. The layout corresponds to placement/routing activities to implement geometric shapes of different materials on the layout to create the various electrical components on an integrated circuit and to represent electronic and circuit IC components as geometric objects with varying shapes and sizes. Many phases of electronic design process may be performed with computer aided design (CAD) tools or electronic design automation (EDA) systems. For example, a schematic editing tool may be used to create, edit, and/or perform verification operations of a schematic representation of a circuit design. A layout editing tool may be used to create, edit, and/or perform verification operations for a layout representation of the circuit design.

The design data acquired in step 102 may include at least the schematic data and layout data for a given electronic design. After ECO activity by a schematic designer, the design data may now also include schematic data for a new schematic.

At 104, the layout data is displayed within an interface for a layout editing tool. At 106, multiple schematic views are displayed within the user interface(s). In one embodiment, a separate interface component (e.g., window) is provided for each of the schematic view. A first interface window is provided to display earlier schematic data and a second interface window is provided to display revised schematic data. In one embodiment, the layout interface initially displays a version of the layout that corresponds to the earlier schematic data (at least until the layout editor edits the layout).

It is noted that in one embodiment, the old version of the schematic is LVS (layout versus schematic) correct relative the old version of the layout. It is assumed that during a previous iteration of the layout editing process, LVS was performed to check that the contents of the previous layout design matched the contents of the previous schematic design. However, any additional edits that are made to create the updated schematic may have introduced substantive changes that makes the new schematic no longer LVS correct relative to the old layout.

It is this principle that is used by the current embodiment to identify relevant changes between the old schematic and the new schematic, since any differences between the old schematic and the new schematic that does not affect the results of an LVS between the new schematic and the old layout would likely not be considered "relevant" enough to need to be highlighted to the designer. However, any changes between the old schematic and the new schematic that causes a LVS violation would likely be relevant enough that a layout designer would deem such a change pertinent with respect to the job of editing the layout.

Therefore, at 108, LVS analysis is performed between the new schematic and the current layout data (for the old schematic). At 110, a listing interface may be provided to list any of the results of performing the LVS operation. The listing interface may, for example, present a list of any un-generated objects, which pertain to any new objects that are included in the updated schematic but do not appear in the old schematic. The listing interface may also present a list of any un-bound objects, which pertain to any existing objects that are included in the old schematic, but are deleted from the new schematic.

At 112, the system may receive a user selection of one or more objects within the listing interface to be highlighted. At 114, highlighting or element focusing may be applied to any of or both of the first schematic view or second schematic view, depending upon the desired actions taken by the user. For example, an element that is added to a schematic could be highlighted in the new schematic view interface, while an element that is deleted a schematic could be highlighted in the old schematic view.

FIGS. 2A-E provide an illustrative example of the invention. The top portion of this figure illustrates an example edit that may occur to a schematic.

Figure 2A:
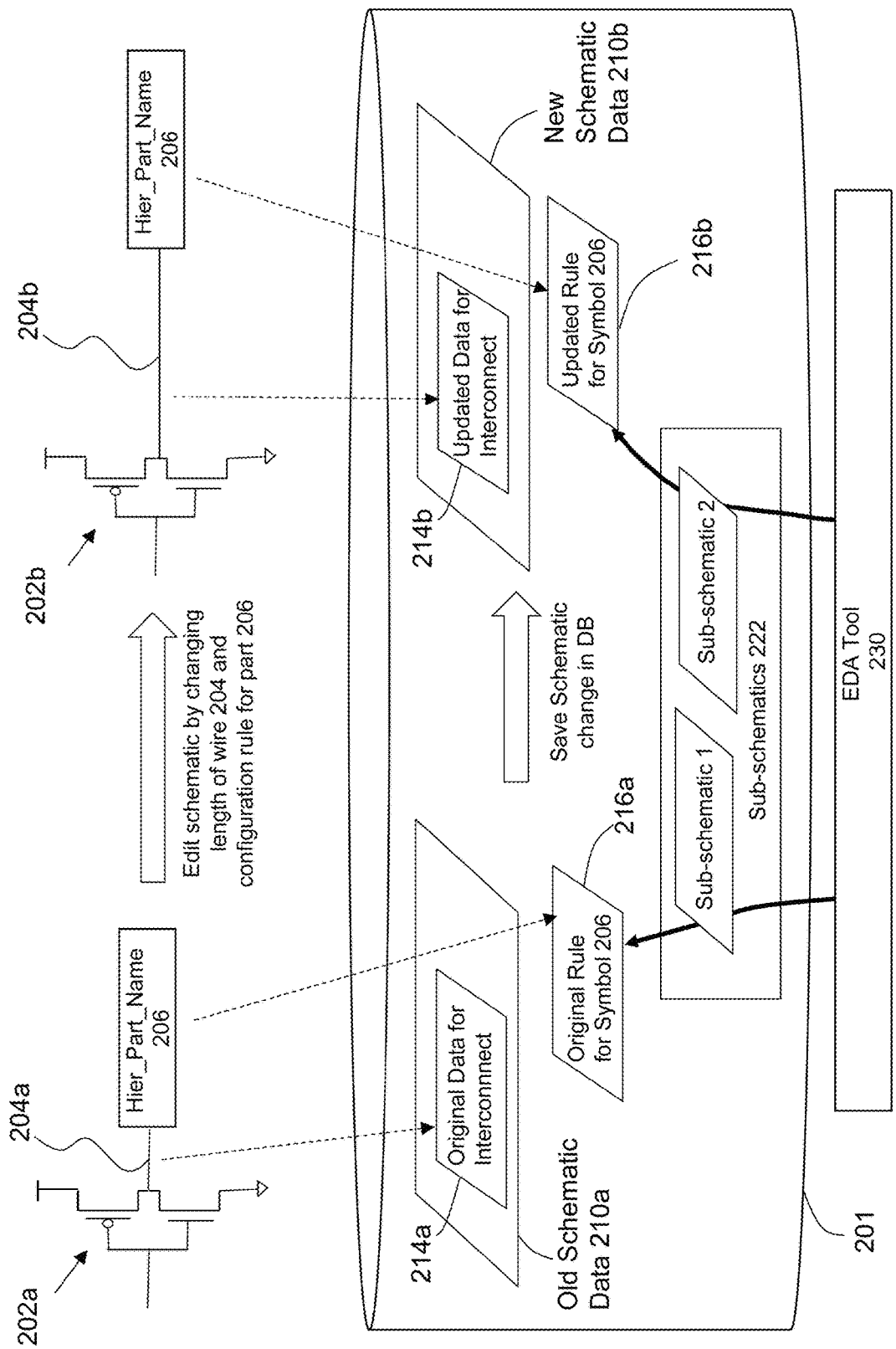
FIGS. 2A-E provide an illustrative example of the invention.

In FIG. 2A, portion 202a shows a previous version of a simple schematic that includes two transistors that are connected to a part/symbol 106. In many electronic design software systems that implement hierarchical designs, a designer may choose to create a "symbol" for a design element. In general, the designer may create the symbol by creating a cellview having a library/cell name, along pin connection information and inheritance data. Notably, a configuration rule may exist that links that symbol to a sub-schematic, where the schematic itself does not reference the specific sub-schematic is associated with the symbol in the schematic. Instead, during operation of the EDA tool, the EDA tool will interpret the symbol to include the contents of the appropriate sub-schematic that is linked to the schematic by way of the configuration rule. In this manner, the use of symbols and configuration rules permits more efficient designing processes and procedures, and permits convenient re-use of the sub-schematics, rather than requiring the designer to manually insert the repeated details of each sub-schematic over and over again into the multiple locations in the schematic that use the same contents of the sub-schematic.

During the schematic editing process of an ECO, an updated schematic 202b may be created. In this illustrative example, two changes have occurred during the ECO process with respect to the updated schematic 202b. First, the ECO changes have lengthened the wire segment 204a into a slightly longer wire segment 204b. Second, a configuration rule may have been updated to associate symbol 206 to a second sub-schematic 2 for the new schematic 202b, rather than a first sub-schematic 1 that was associated with the symbol 206 for the original schematic 202a.

Both the old schematic data 210a and the new schematic data 210b may be saved into a design database 201. The old schematic data 210a may correspond to the original data 214a for the wire segment 204a, while the new schematic data 210b may correspond to the new data 214a for the updated wire segment 204b. In addition, the old schematic data 210a may be associated with an original configuration rule 216a that relates the symbol 206 in the old schematic 202a to the first sub-schematic 1. The new schematic data 210b may be associated with a new configuration rule 216b that relates the symbol 206 in the new schematic 202b to the second sub-schematic 2.

As was previously discussed, the problem addressed by this disclosure is that conventional electronic design tools do not provide a comprehensively effective or efficient approach to identify and visualize the most relevant changes between a first earlier schematic and a second updated schematic.

Consider the simplistic and non-optimal way to try and address this problem by merely performing a DIFF operation between the old schematic data and the new schematic data in the design database 201. With the currently illustrative example, this type of differencing operation would identify the change from the wire segment 204a to updated wire segment 204b as a change in the schematic data. However, it is likely that in this simple example, the lengthening of the wire segment in the schematic would not affect any connectivity aspects of the design between the old schematic and the new schematic. Therefore the simple approach of using a DIFF to highlight this change would likely result in a false positive since this change to the wire segment would not cause a meaningful change to the design.

Figure 2B:
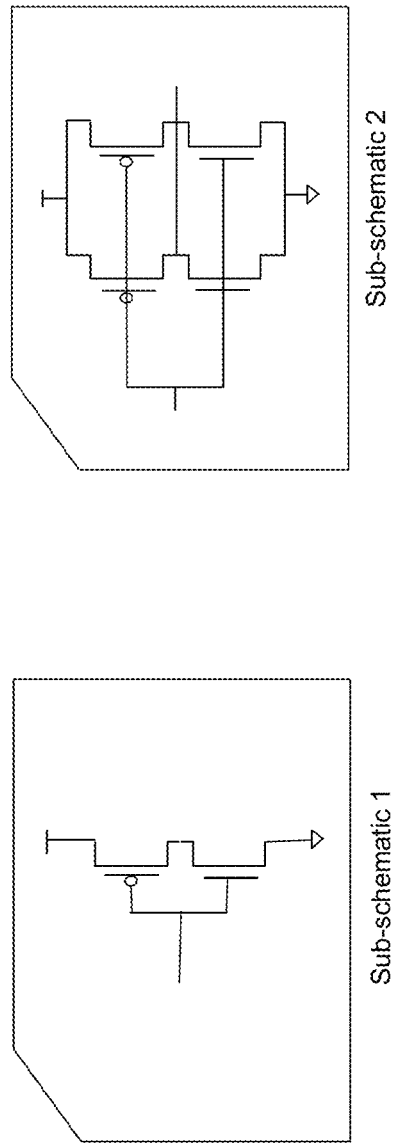
Figure 2C:
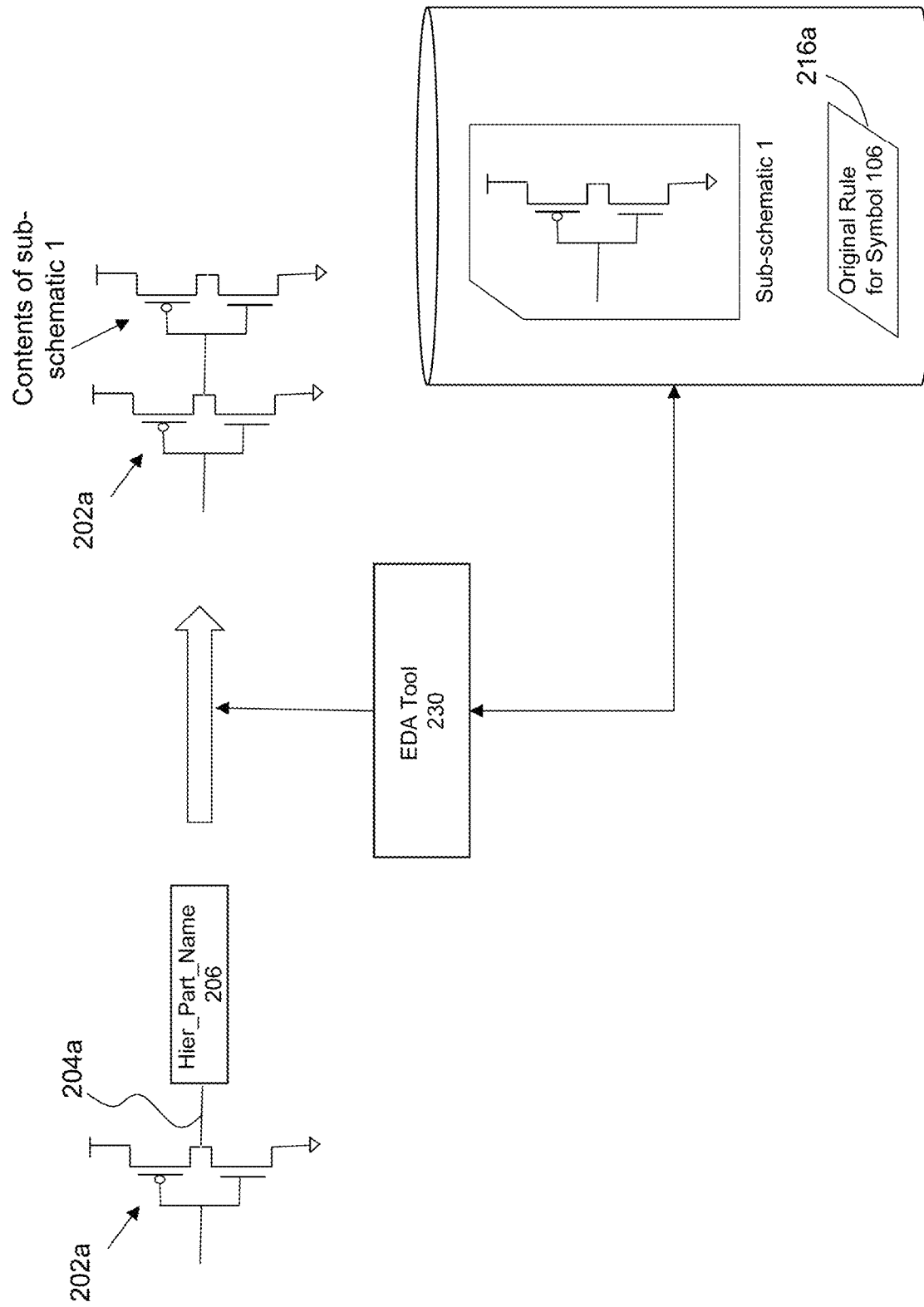
Figure 2D:
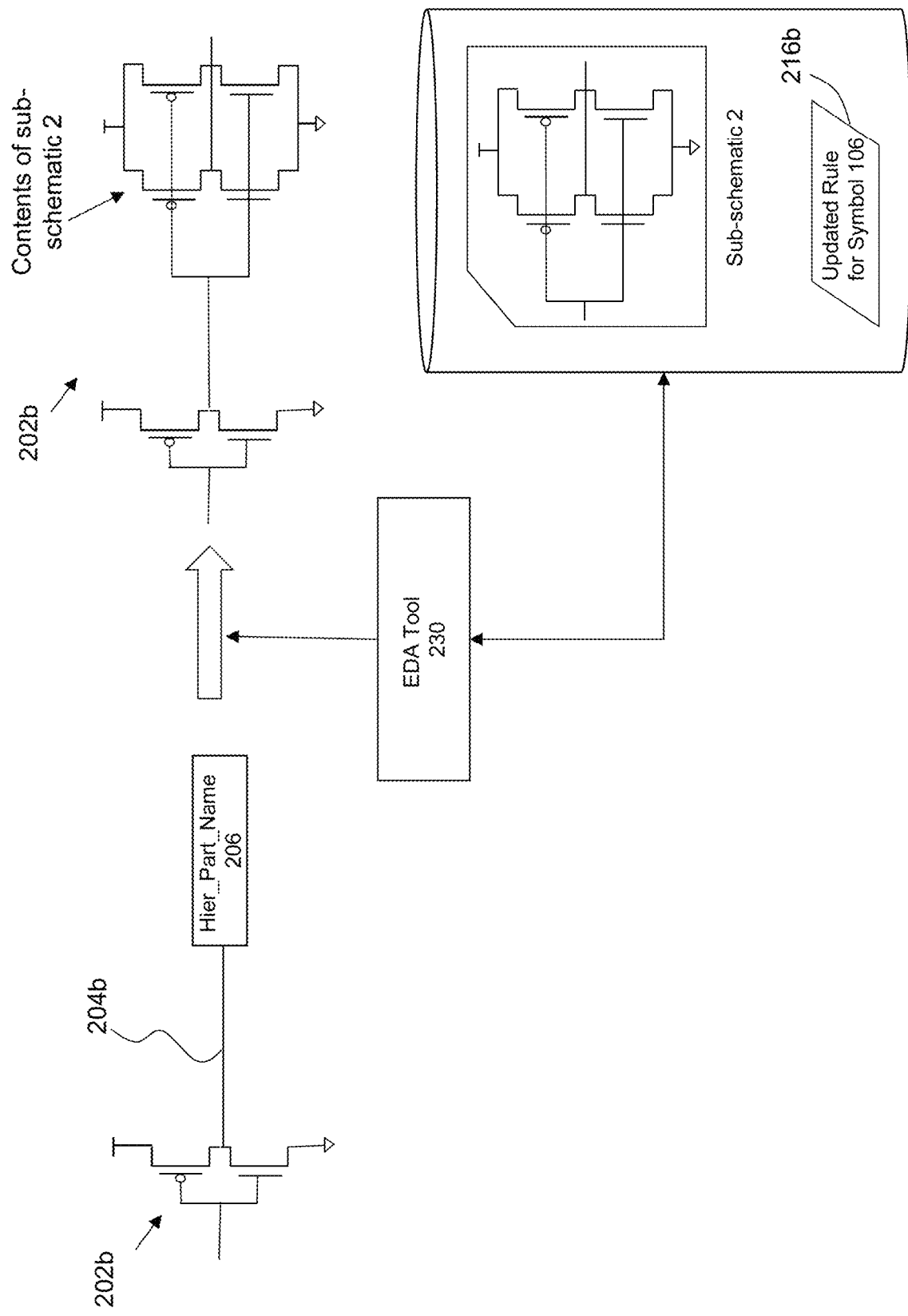

In addition, the simple DIFF operation is likely to also fail to appreciate the significant change that occurred when the configuration rule was updated to associate the symbol 206 with sub-schematic 2 for the new schematic 202b rather than the sub-schematic 1 that was associated with the old schematic 202a. To explain, consider the differences that may exist between the two sub-schematics as shown in FIG. 2B. As can be seen, sub-schematic 1 has a different configuration and number of design components as compared to the contents of sub-schematic 2. However, it is by operation of an EDA tool which resolves the linkage provided by the configuration rule which can make sense of any changes that are caused by such changes. FIG. 2C illustrates that with the old version 202a of the schematic, it is the operation of EDA tool 230 that causes the symbol 206 within the old schematic 202a to resolve to the contents of sub-schematic 1. In contrast, as shown in FIG. 2D, the symbol 206 within the new schematic 202b resolves to the contents of sub-schematic 2.

A simple differencing operation that only operates only upon design data within a database, particularly a third party tool that is external to the EDA tool 230, is likely to completely fail to identify this significant change—and therefore would likely result in a false negative. This is because this type of change relies upon the operation of a EDA tool, and an external analysis tool that does not itself operate upon the design data and the configuration rules like an EDA tool to implement the design would not have an effective way to know the true nature of the schematic and any changes that depend upon a configuration rule change and/or a change to a sub-schematic.

Figure 2E:
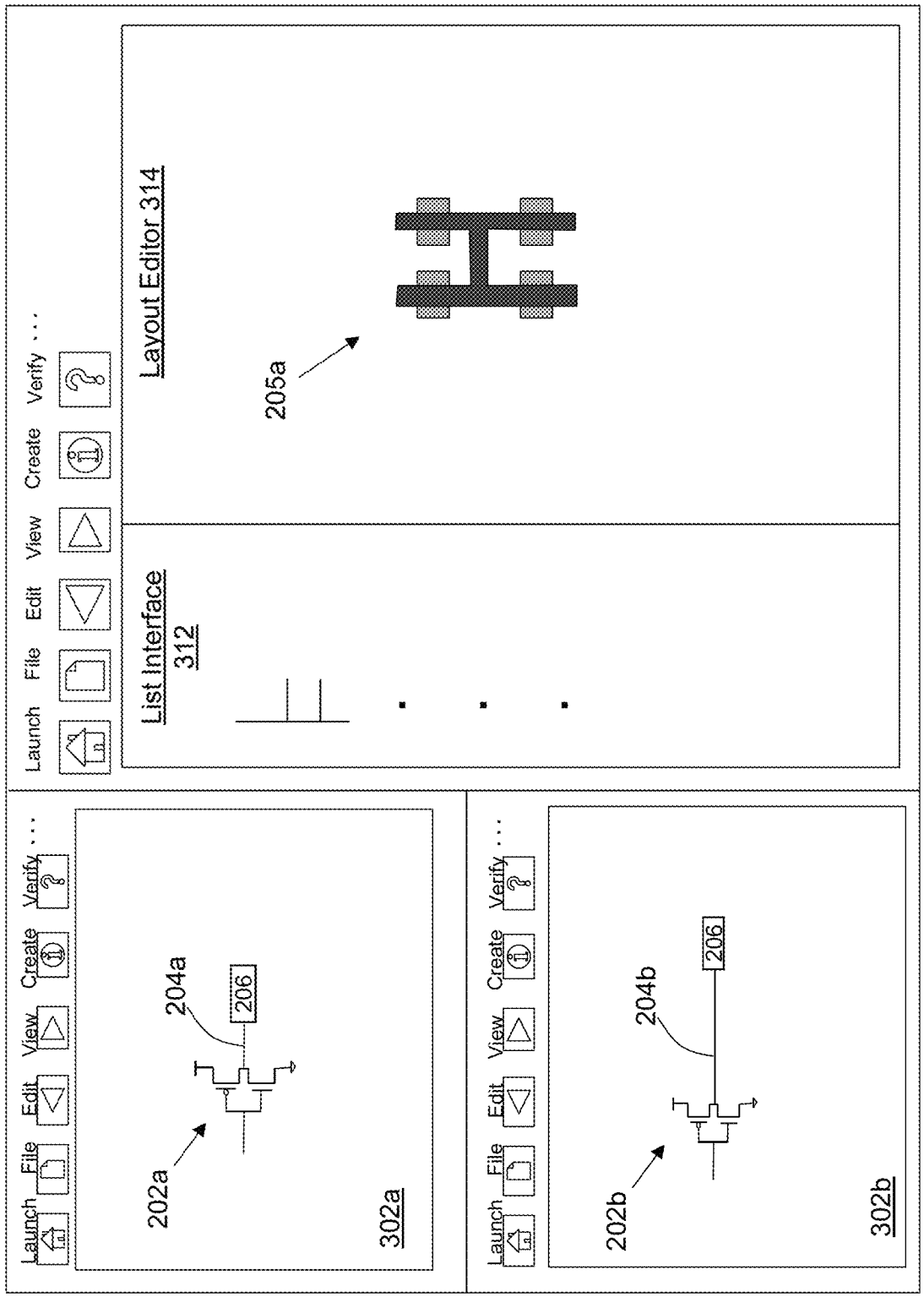

FIG. 2E provides an illustrative example of interface(s) for an EDA tool to implement some embodiments of the invention. The EDA tools may provide one or more interfaces to allow the user (e.g., engineer or designer) to interactively and visually operate the EDA tools. The right side of the figure shows an interface for a layout editor 314, which is used to visually show and allow manipulation of geometric shapes and components within a layout. A list interface 312 may be provided to display textual information about the objects within the design, such as a list of the components, interconnect, and parameters used within the design. The list view 312 may also be used to show the results of performing certain operations on the design, such as to display the results of performing verification actions such as LVS (layout versus schematic) and to display any possible problems that are identified when running LVS. LVS is performed to check that the contents of the layout design match the contents of the schematic design, e.g., where the devices and nets of the schematic match the devices and nets of the layout. Any non-matching elements in one or the other can be identified by running the LVS operation, and displayed within the list display view 312.

The left side of the figure shows interfaces for one or more schematic editors, which are used to visually show and allow manipulation of elements within a schematic. Some embodiments of the invention provide multiple schematic view interfaces, where a first schematic interface displays an older schematic version and a second schematic interface displays a newer schematic version. Coordination is performed between the multiple schematic views such that an element within any of the first or second schematic views is appropriately highlighted based upon a user input.

In particular, a first schematic interface 302a is used to display the old version of the schematic 102a and a second schematic interface 302b is used to display a new version of the schematic 102b. The interface for the layout editor 314 displays the version of the layout 104a that corresponds to the older version of the schematic 102a.

By providing multiple schematic views, this permits the graphical user interface (GUI) of the EDA tool to adaptively highlight of any element within the schematic(s), regardless of whether the element is newly added, deleted, or just simply changed in some way between the old schematic and the new schematic.

According to some embodiments, one approach that can be taken to identify significant changes between the schematics is to analyze comparative results of performing LVS checks between the old layout against the old and new schematics. LVS is performed to check that the contents of the layout design match the contents of the schematic design, e.g., where the devices and nets of the schematic match the devices and nets of the layout. Any non-matching elements in one or the other can be identified by running the LVS operation, and displayed within the list display view.

Figure 3A:
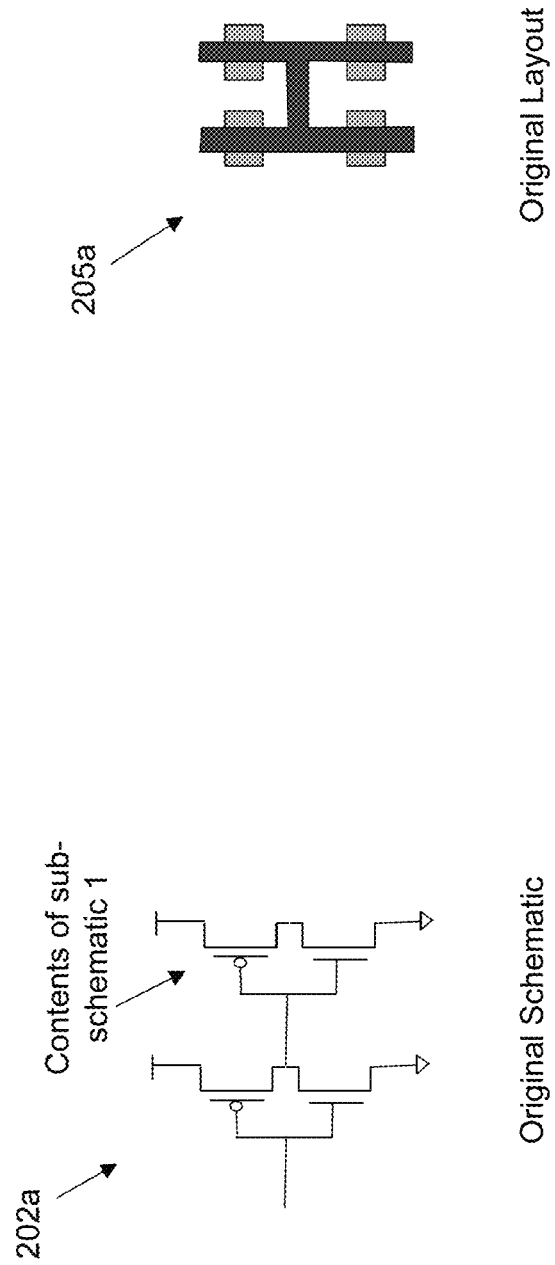
FIGS. 3A-F provides an illustration that confirms the LVS correctness between an old schematic and an old layout.
Figure 3B:
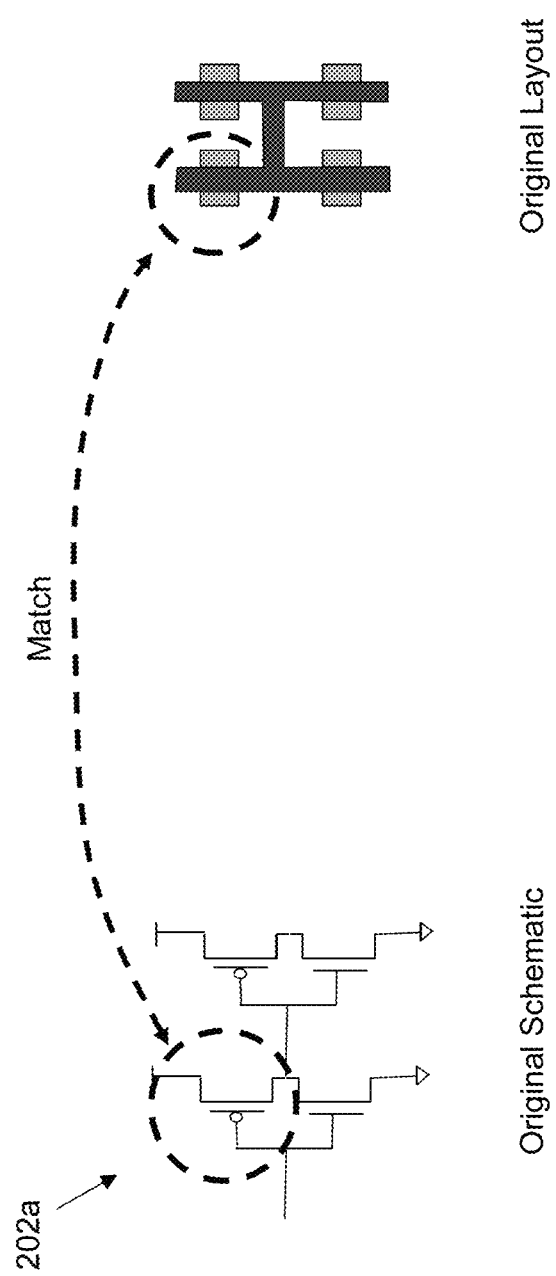
Figure 3C:
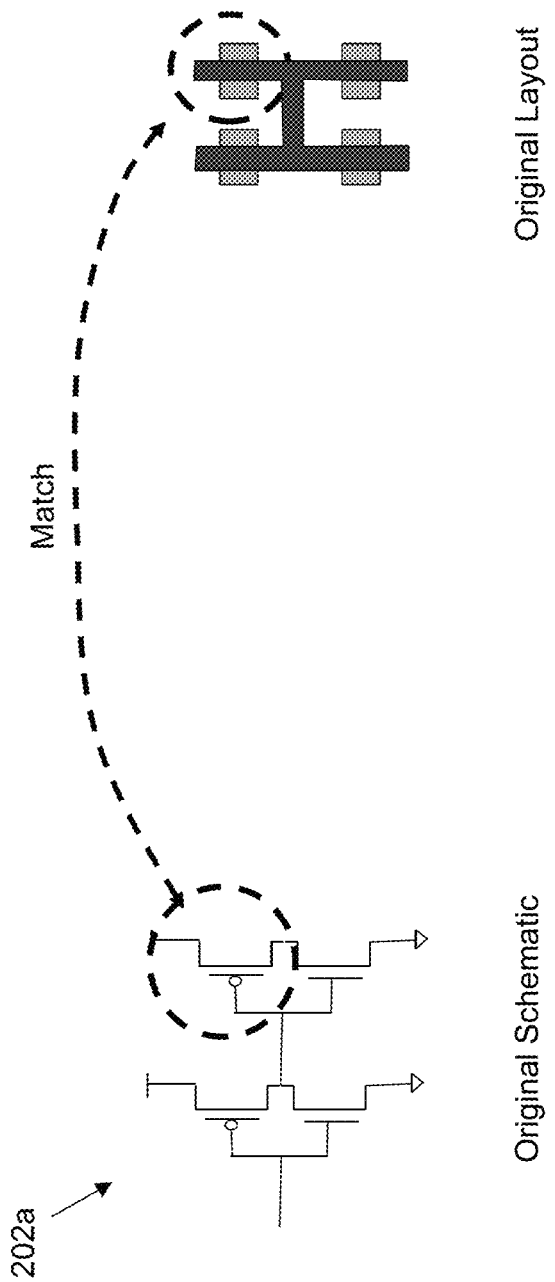
Figure 3D:
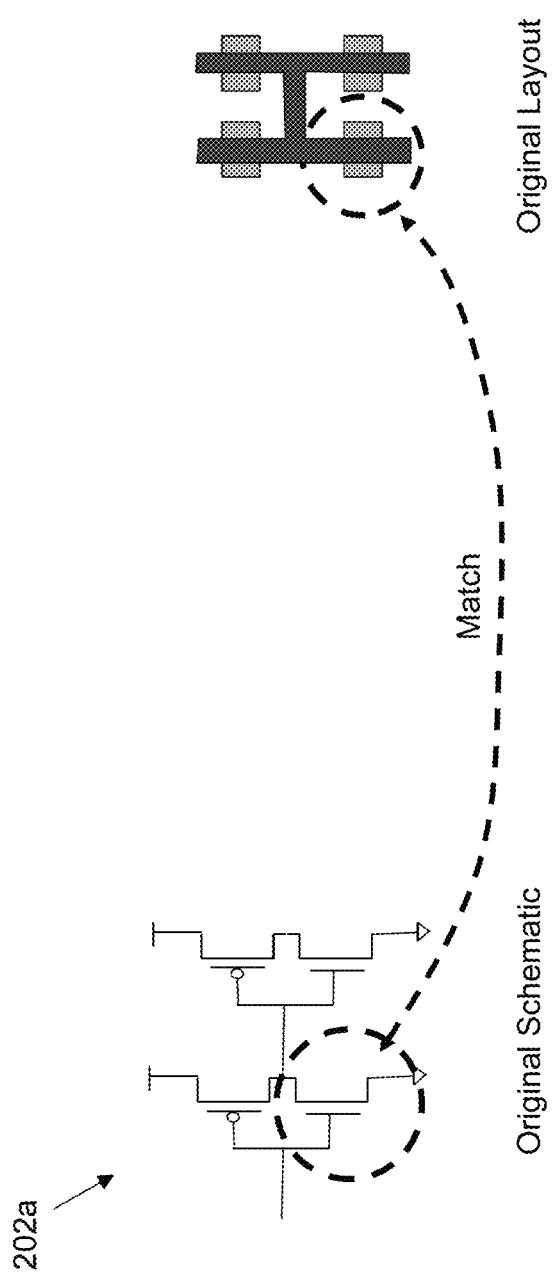
Figure 3E:
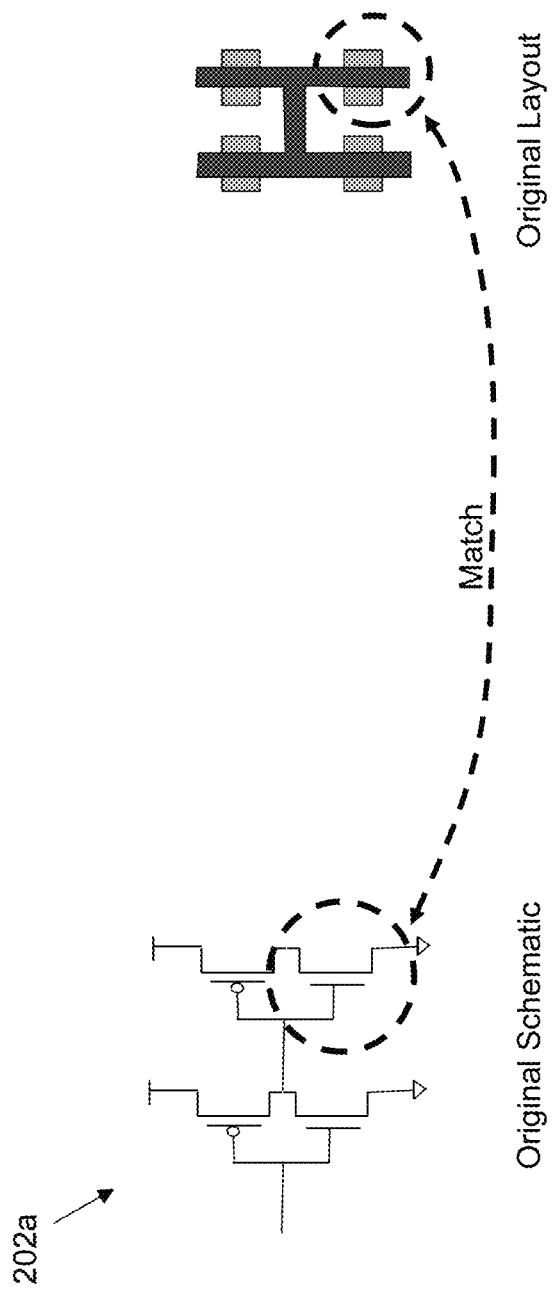
Figure 3F:
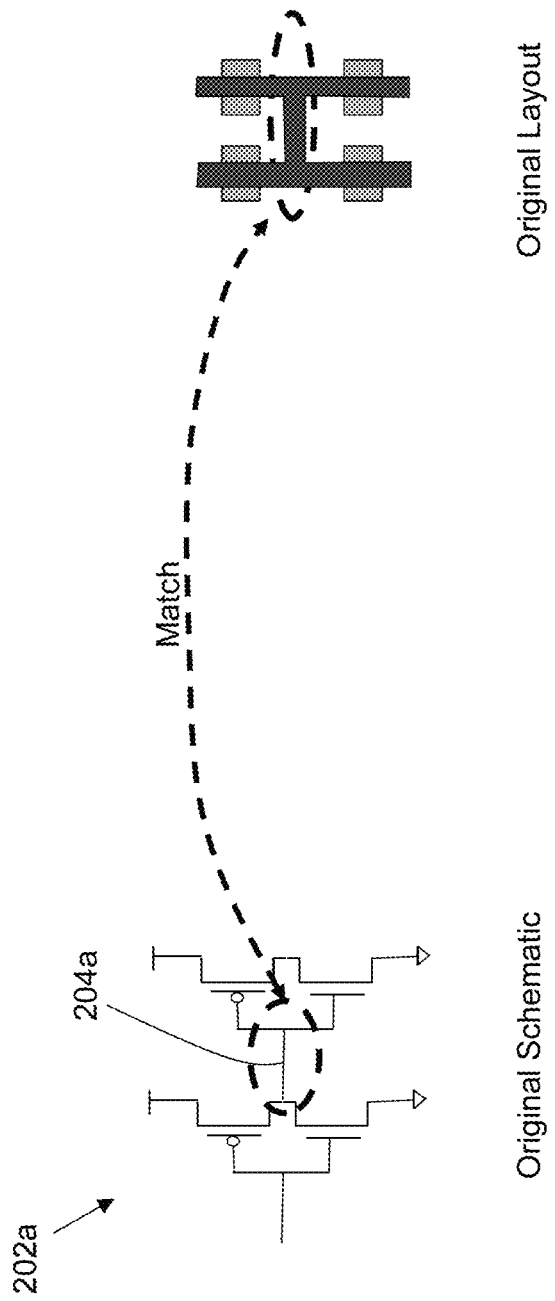

Assume that the old version of the schematic is currently LVS correct relative to the original layout. FIGS. 3A-F provides an illustration that confirms the LVS correctness between the old schematic 202a and the old layout 205a. FIG. 3A shows the contents of the old schematic 202a (with the contents of the sub-schematic 1 included in the schematic 202a) and the old layout 205a. FIG. 3B shows that the transistor device at the upper left portion of the schematic matches the configuration of the geometric shapes at the upper left portion of the layout. FIG. 3C shows that the transistor device at the upper right portion of the schematic matches the configuration of the geometric shapes at the upper right portion of the layout. FIG. 3D shows that the transistor device at the lower left portion of the schematic matches the configuration of the geometric shapes at the lower left portion of the layout. FIG. 3E shows that the transistor device at the lower right portion of the schematic matches the configuration of the geometric shapes at the lower right portion of the layout. Finally, FIG. 3F shows that the wire segment 204a in the schematic matches the configuration of the geometric shapes in the middle portion of the layout.

Figure 4A:
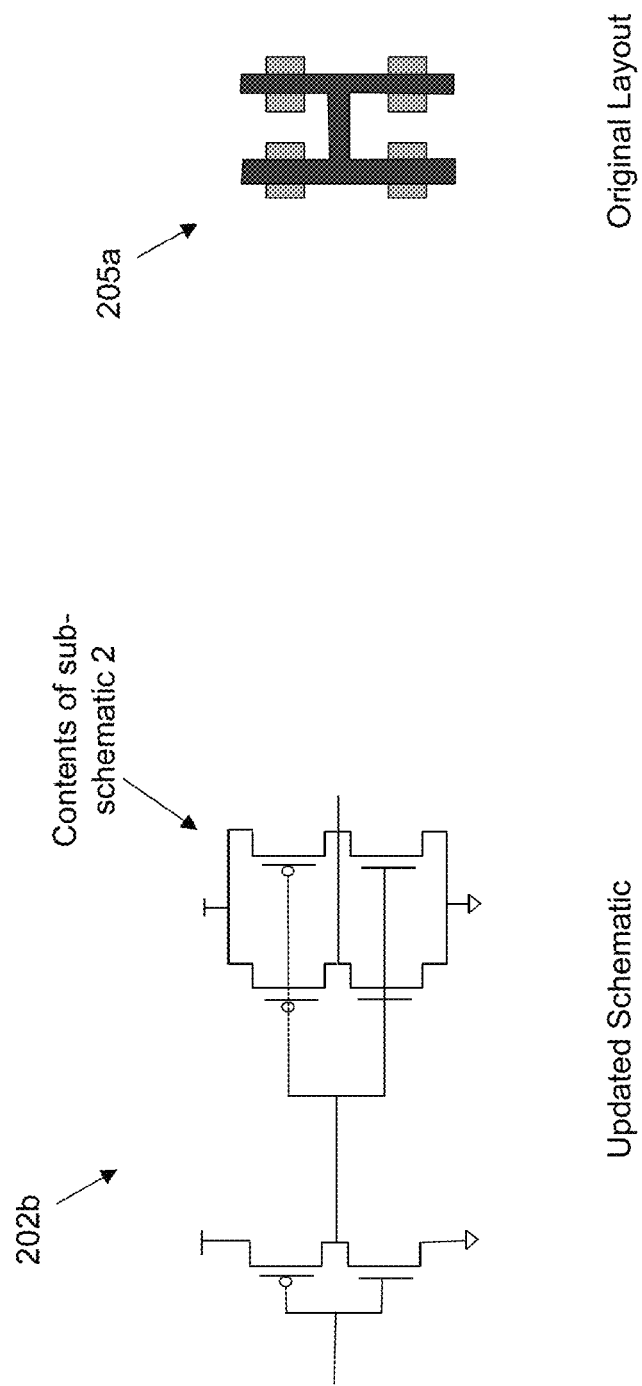
FIGS. 4A-H provides an illustration of a sequence of operations that may be performed for an LVS check between a new schematic and an old layout.

An LVS check can also be performed between the new/updated schematic and the original layout to check whether there are any changes in the updated schematic that would affect the design veracity of the original layout. FIGS. 4A-H provides an illustration of a sequence of operations that may be performed for an LVS check between the new schematic 202b and the old layout 205a. FIG. 4A shows the contents of the new schematic 202b (with the contents of the sub-schematic 2 included in the schematic 202b) and the old layout 205a.

Figure 4B:
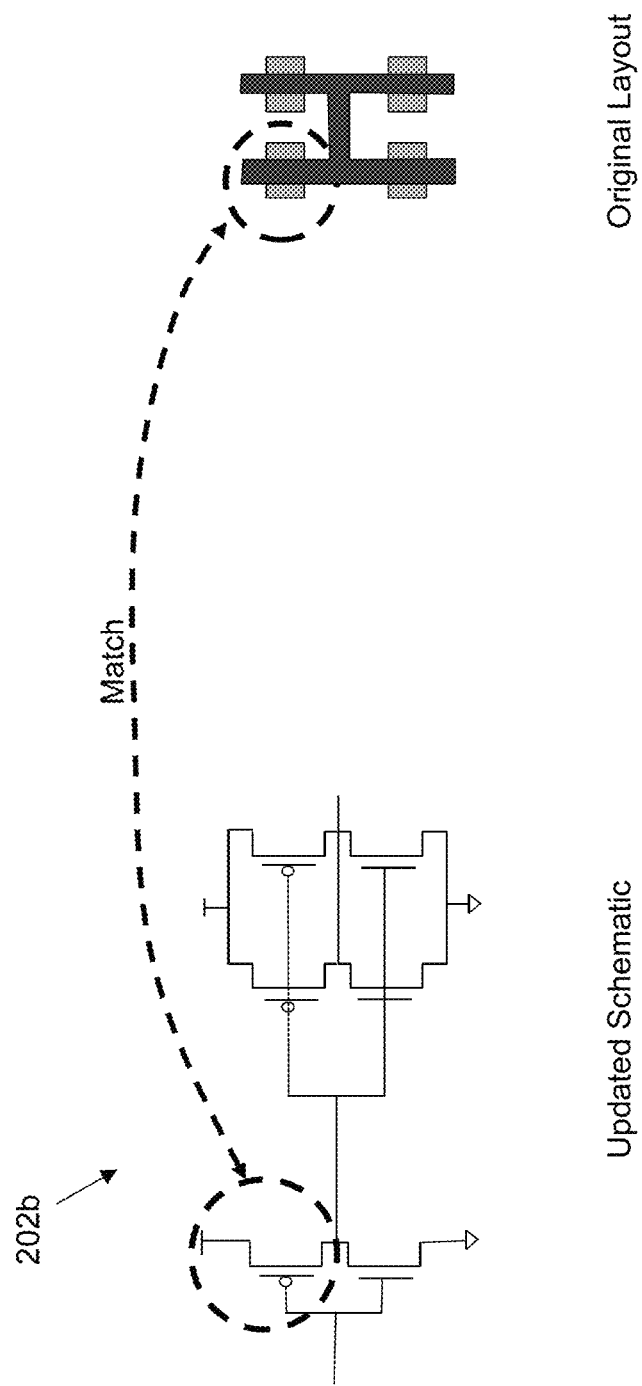
Figure 4C:
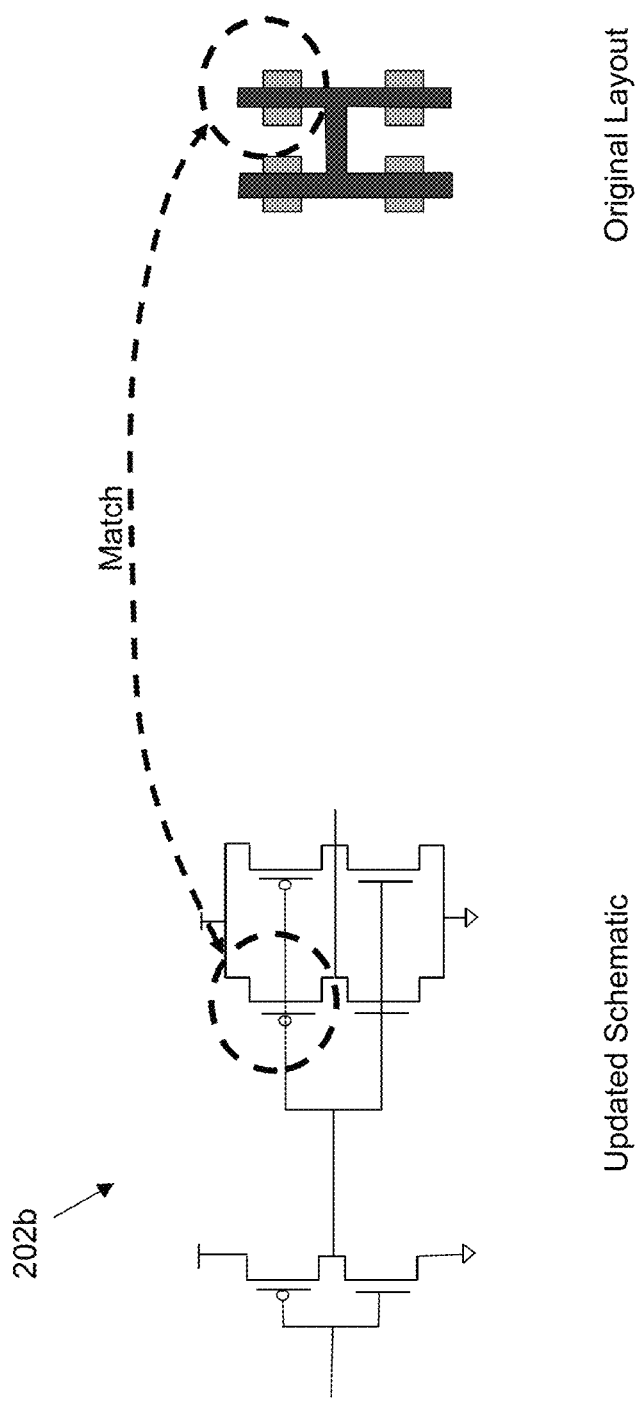
Figure 4D:
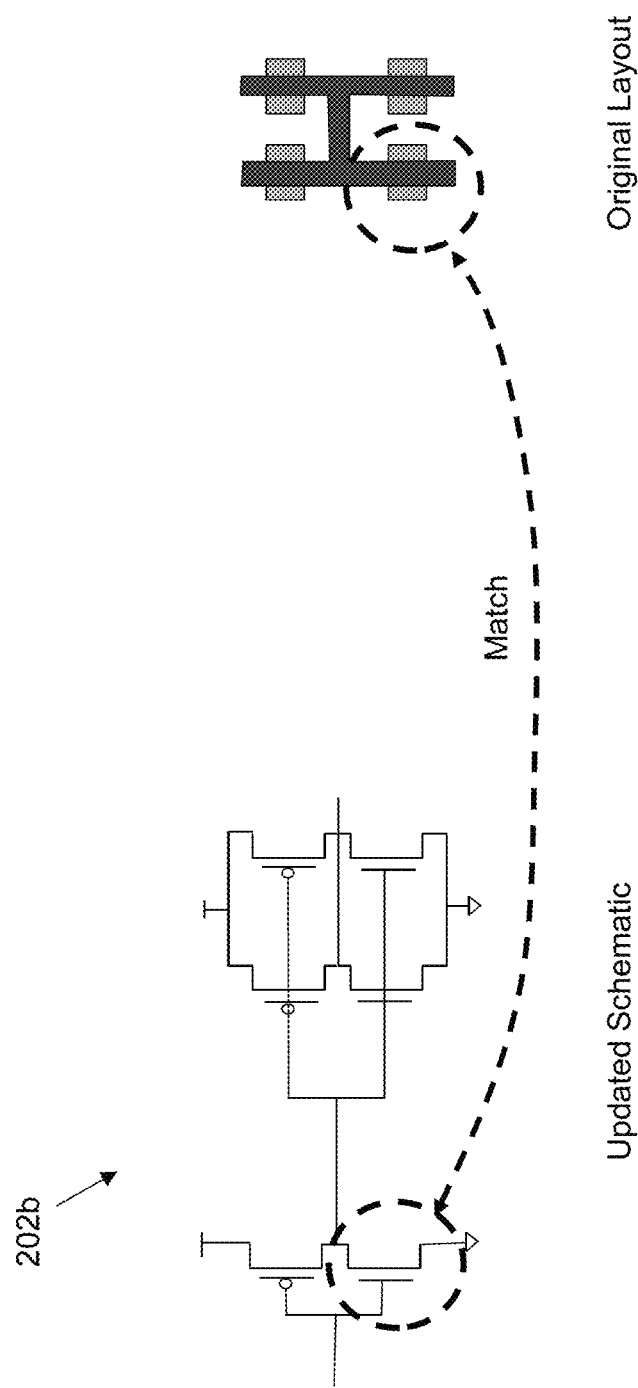
Figure 4E:
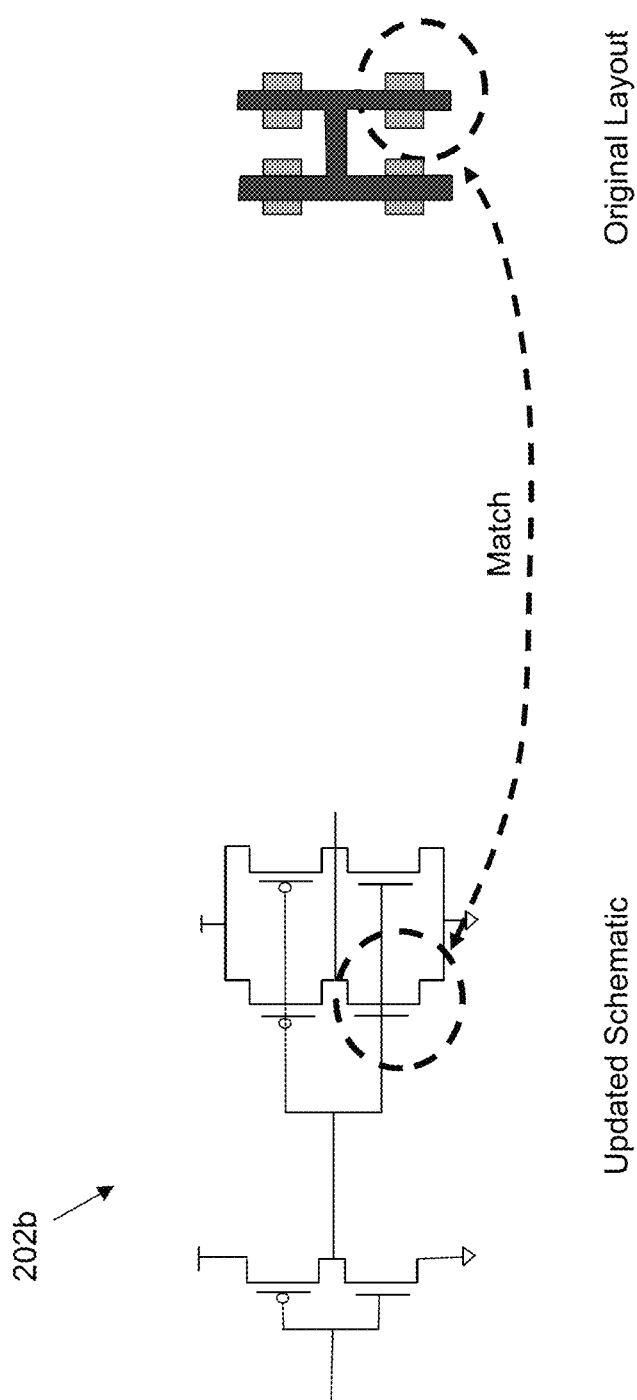

FIG. 4B shows that the transistor device at the upper left portion of the schematic matches the configuration of the geometric shapes at the upper left portion of the layout. FIG. 4C shows that the transistor device at the upper middle portion of the schematic matches the configuration of the geometric shapes at the upper right portion of the layout. FIG. 4D shows that the transistor device at the lower left portion of the schematic matches the configuration of the geometric shapes at the lower left portion of the layout. FIG. 4E shows that the transistor device at the lower middle portion of the schematic matches the configuration of the geometric shapes at the lower right portion of the layout.

Figure 4F:
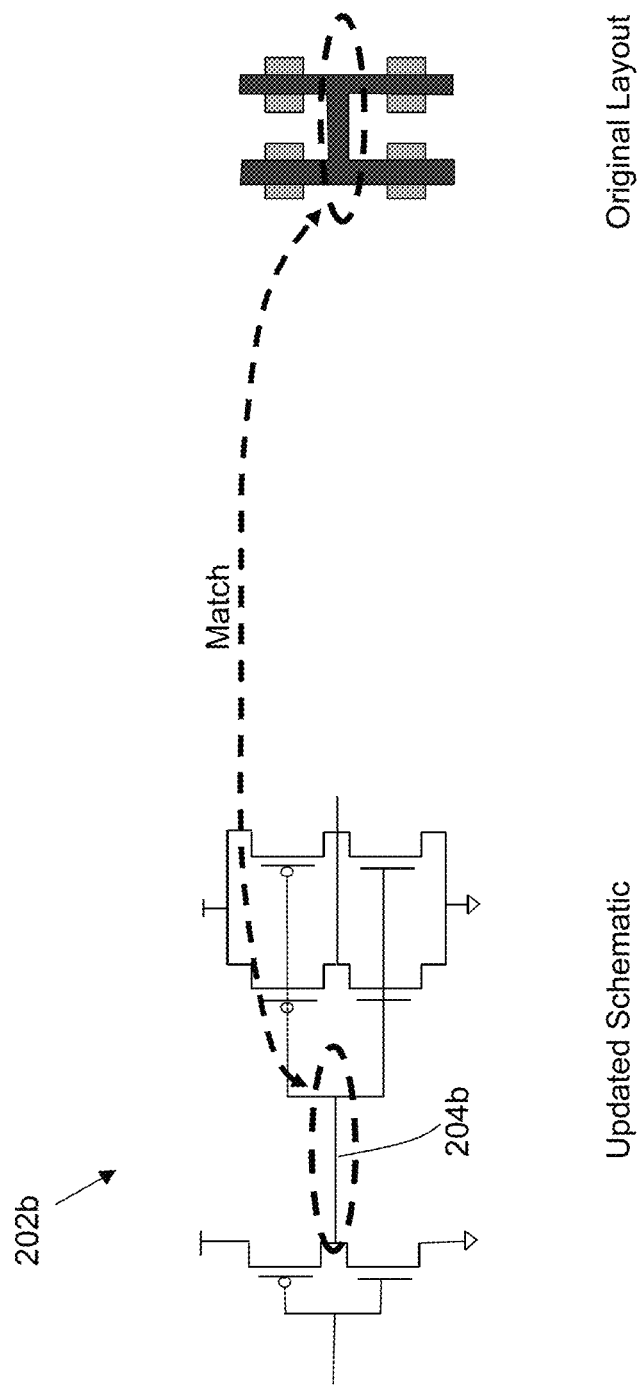

FIG. 4F shows the LVS operation that may occur to check whether the updated wire segment 204b has an LVS problem relative to the old layout 205a. Here, it can be seen that the updated wire segment 204b does indeed match the configuration of the geometric shapes in the middle portion of the layout 205a. This means that even though the updated schematic 202b has a changed portion or wire segment 204b, which changed the configuration of the original wire segment 204a in original schematic 202a, this did not result in an LVS problem since it did not result in a connectivity change and/or problem. Recall that a simple differencing analysis that only operates upon the design data may identify this exact change as a potentially significant change, resulting in a false positive. The current example illustrates that such false positives can be reduced and/or eliminated with the current embodiment of the invention since only pertinent changes (e.g., changes that create connectivity issues) are identified.

Figure 4G:
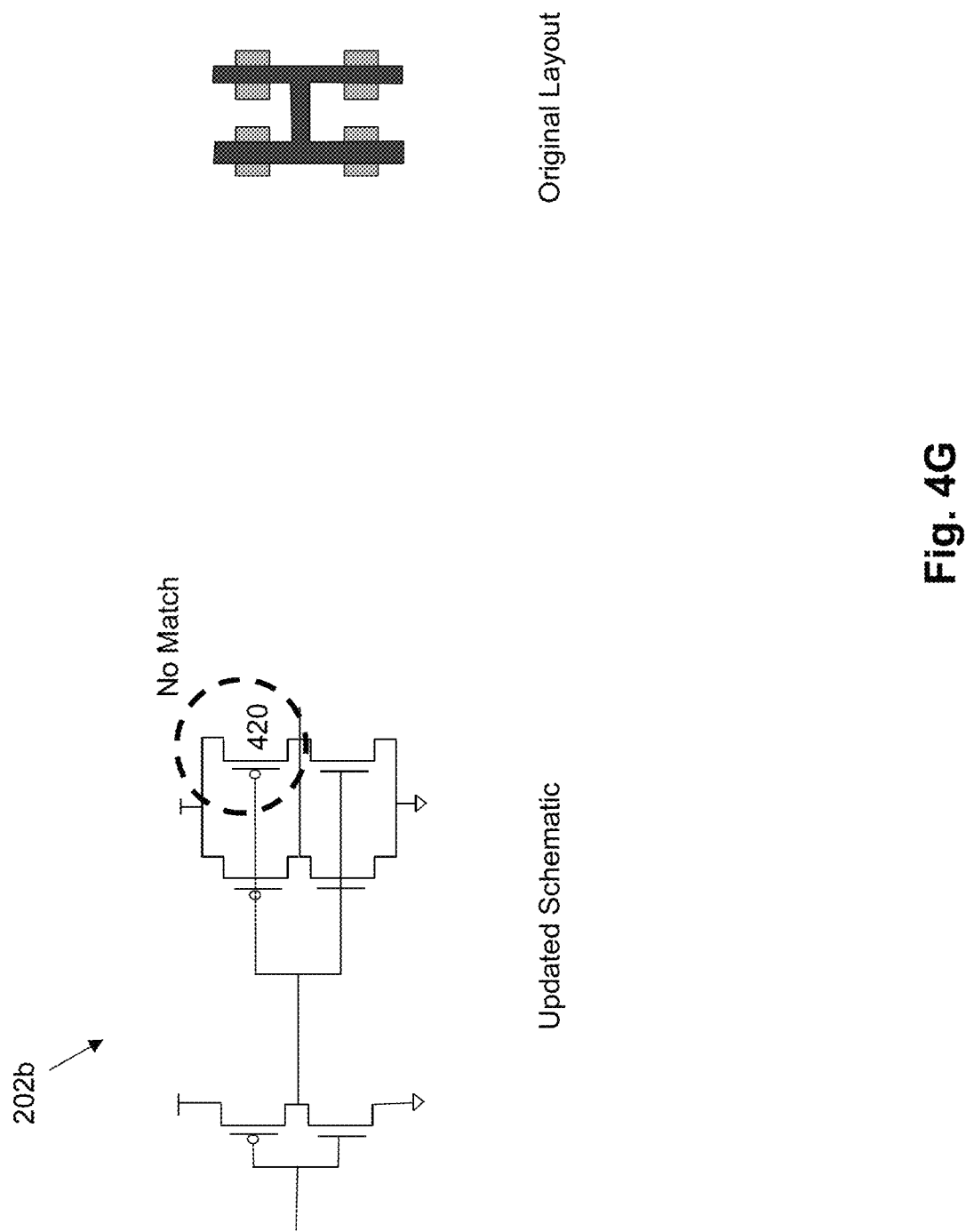
Figure 4H:
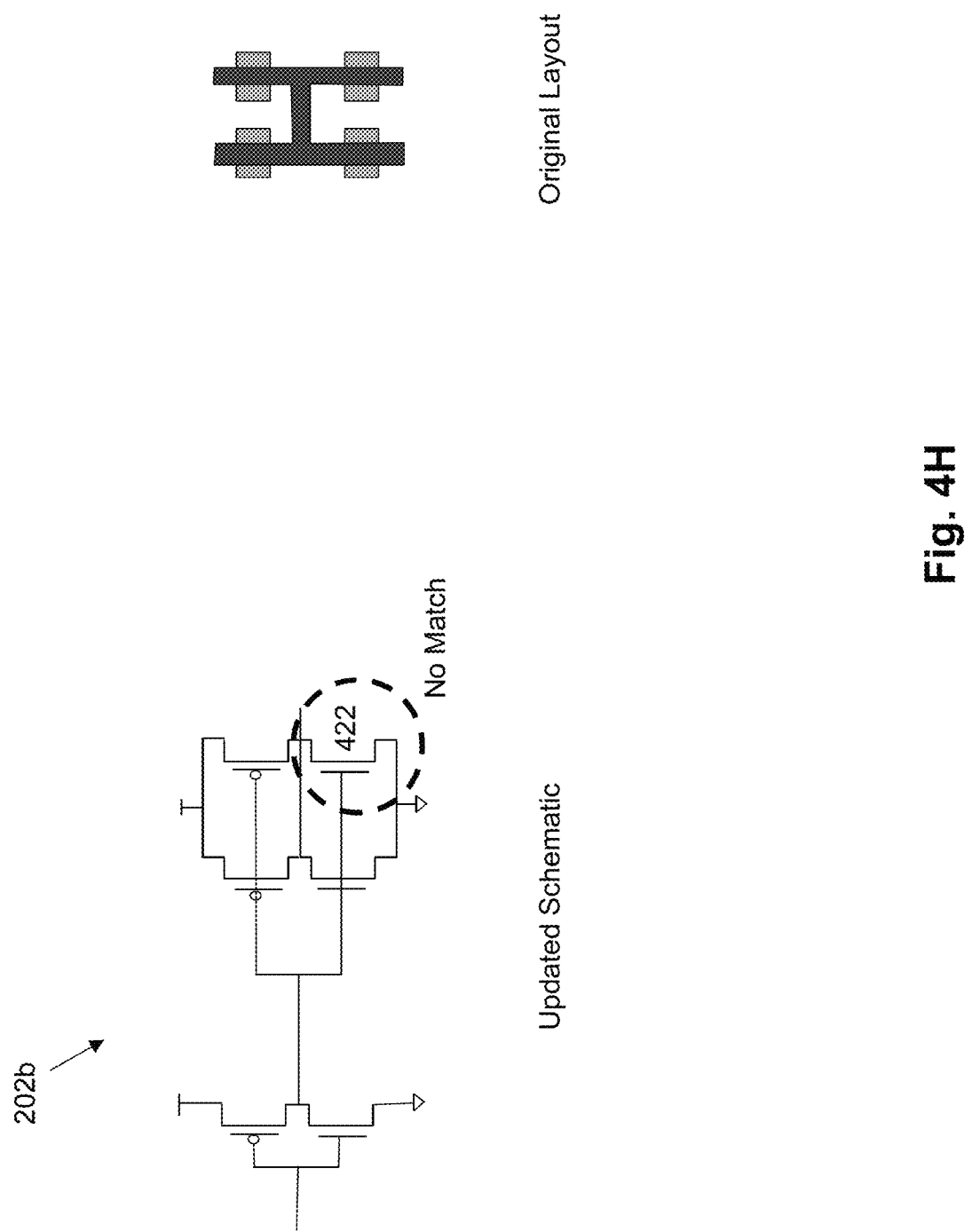

FIG. 4G shows that the transistor device 420 at the upper right portion of the schematic does not match the configuration of any of the geometric shapes in the layout. Similarly, FIG. 4H shows that the transistor device 422 at the lower right portion of the schematic does not match the configuration of any of the geometric shapes in the layout. These are examples of changes that would create connectivity problems, and therefore would be of great interest and value to be identified for the layout designer.

It is notable that these changes to the schematic illustrated in FIGS. 4G and 4H can only be identified after application by the EDA tool of the configuration rules to the symbol in the schematic. Recall that a simple differencing analysis that is external to the EDA tool and only operates upon the design data may fail to identify these exact changes as potentially significant changes, resulting in a false negative. The current example illustrates that such false negatives can be reduced and/or eliminated with the current embodiment of the invention since the current approach applies the configuration rules to the design to identify the pertinent changes resulting from resolution of such rules.

Figure 5A:
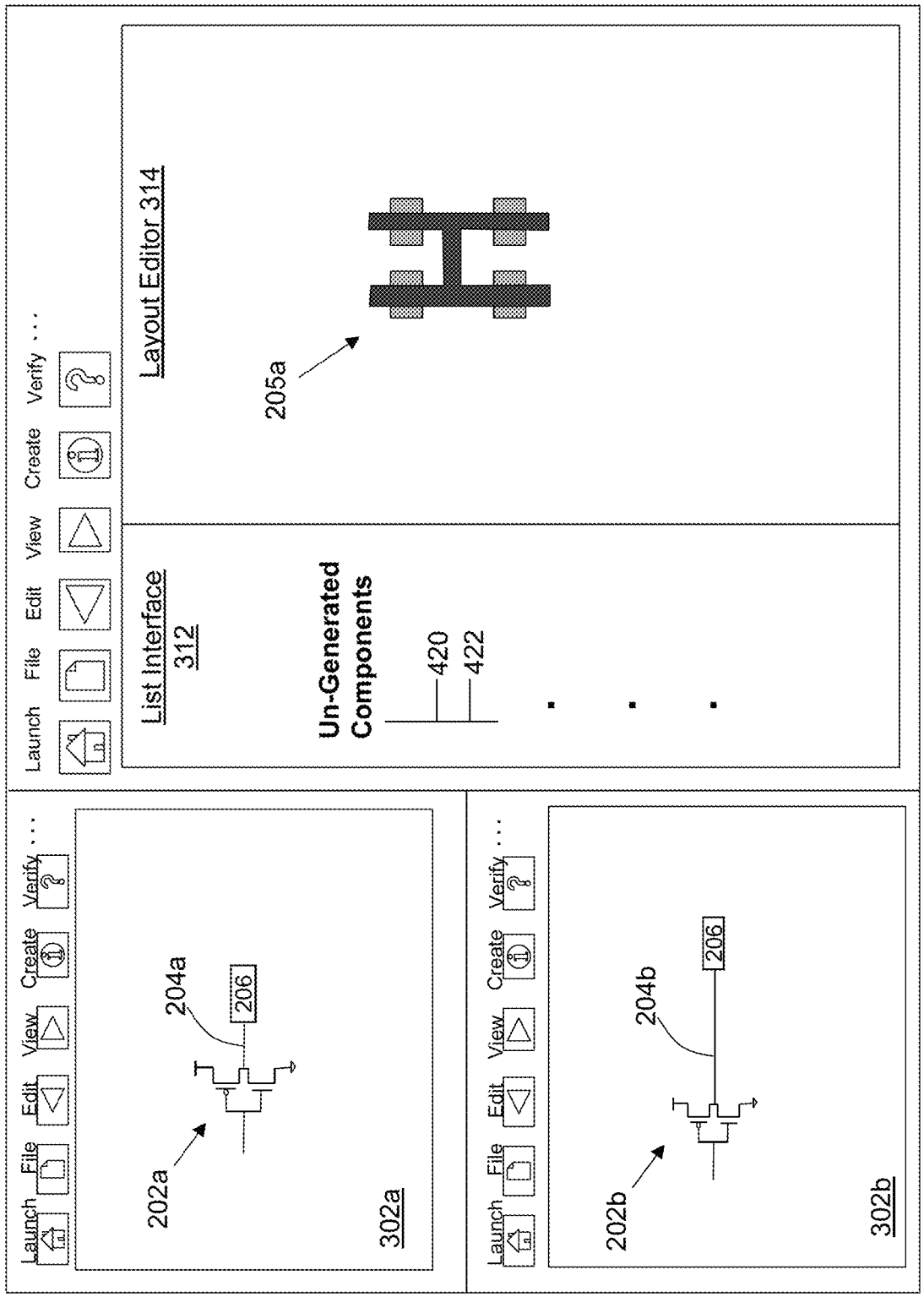
FIGS. 5A-D provide an illustrative example of interface(s) for highlighting elements within the schematics that may be of interest to the designer/user.

FIGS. 5A-D provide an illustrative example of interface(s) for highlighting elements within the schematics that may be of interest to the designer/user. The potentially significant changes can be highlighted by going to the interface view for the old and/or new schematics, and modifying the visual presentation of the schematic in the interface to highlight the changed elements. Recall that the schematic designer had implemented the ECO by changing schematic 2022 to the revised schematic 202b, where the changed schematic 202b is modified to change the length of the original wire segment 204a to the longer wire segment 204b. In addition, the configuration rule was modified to have symbol 206 correspond to sub-schematic 2 instead of sub-schematic 1. As illustrated in FIG. 5A, the interface for the first schematic editor window 302a shows the old schematic 202a. The interface for the second schematic editor window 302b shows the new schematic 202b.

The list interface 312 may be configured to show a list of problematic elements from running the LVS check. For example, the list interface 312 may show a list of un-bound elements (e.g., instance markers) that corresponds to a listing of deleted objects and a list of un-generated elements that corresponds to a listing of newly added objects. For the current example, recall that devices 420 and 422 were identified as non-matching devices that only exist in the new schematic 202b, but do not exist as configured shapes in the old layout 205a. Therefore, these devices can be listed as un-generated components within the list interface 312.

Figure 5B:
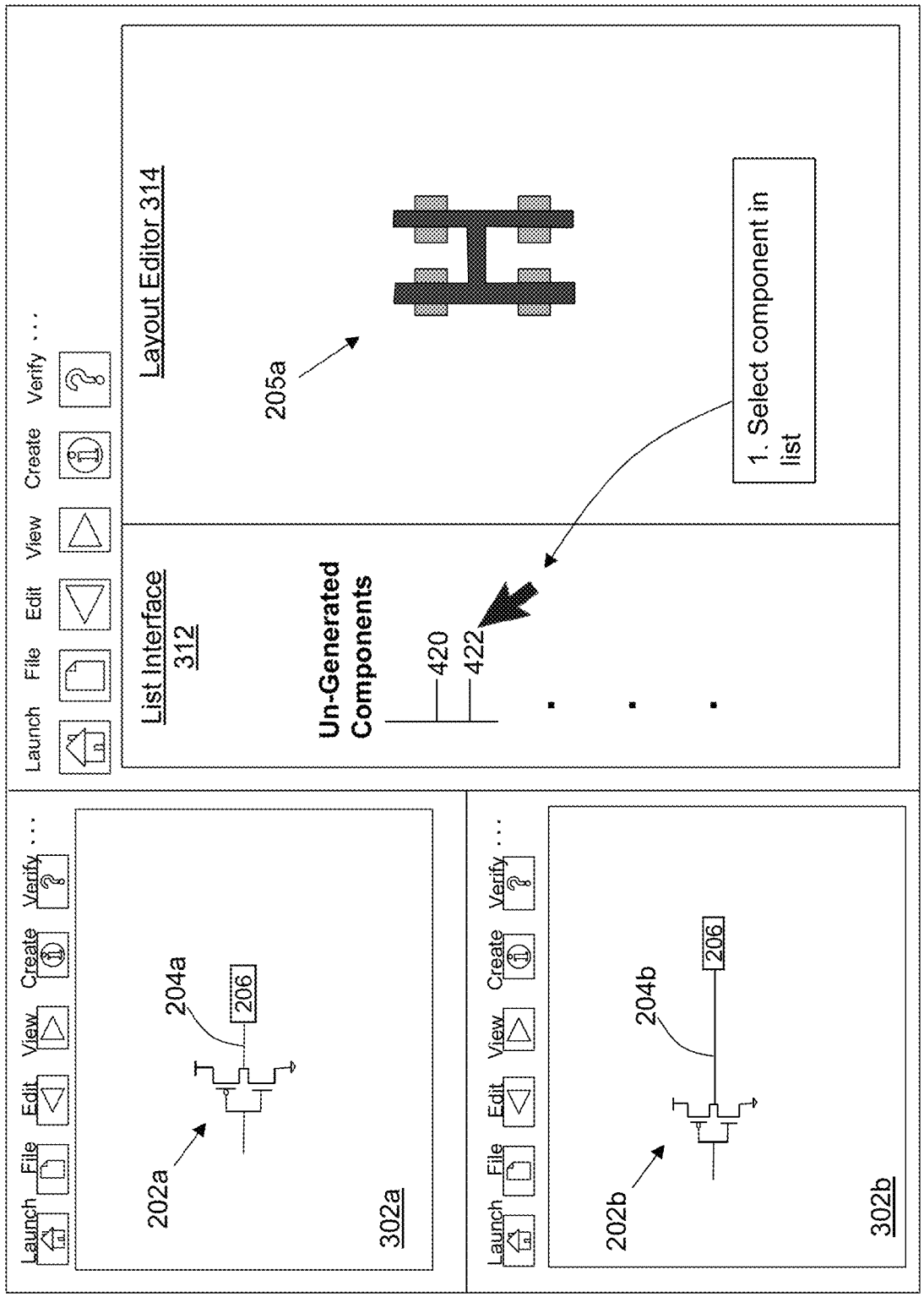
Figure 5C:
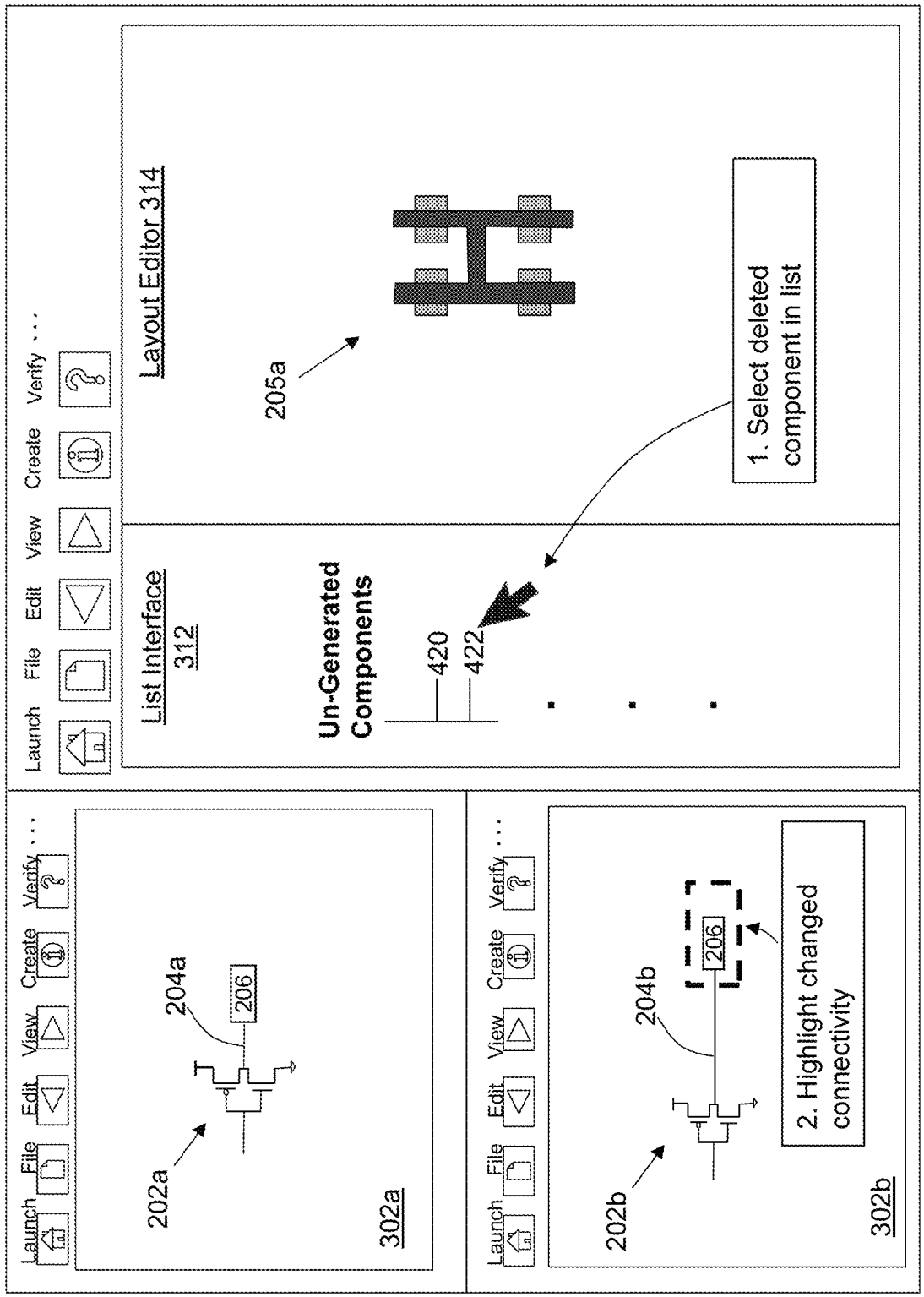
Figure 5D:
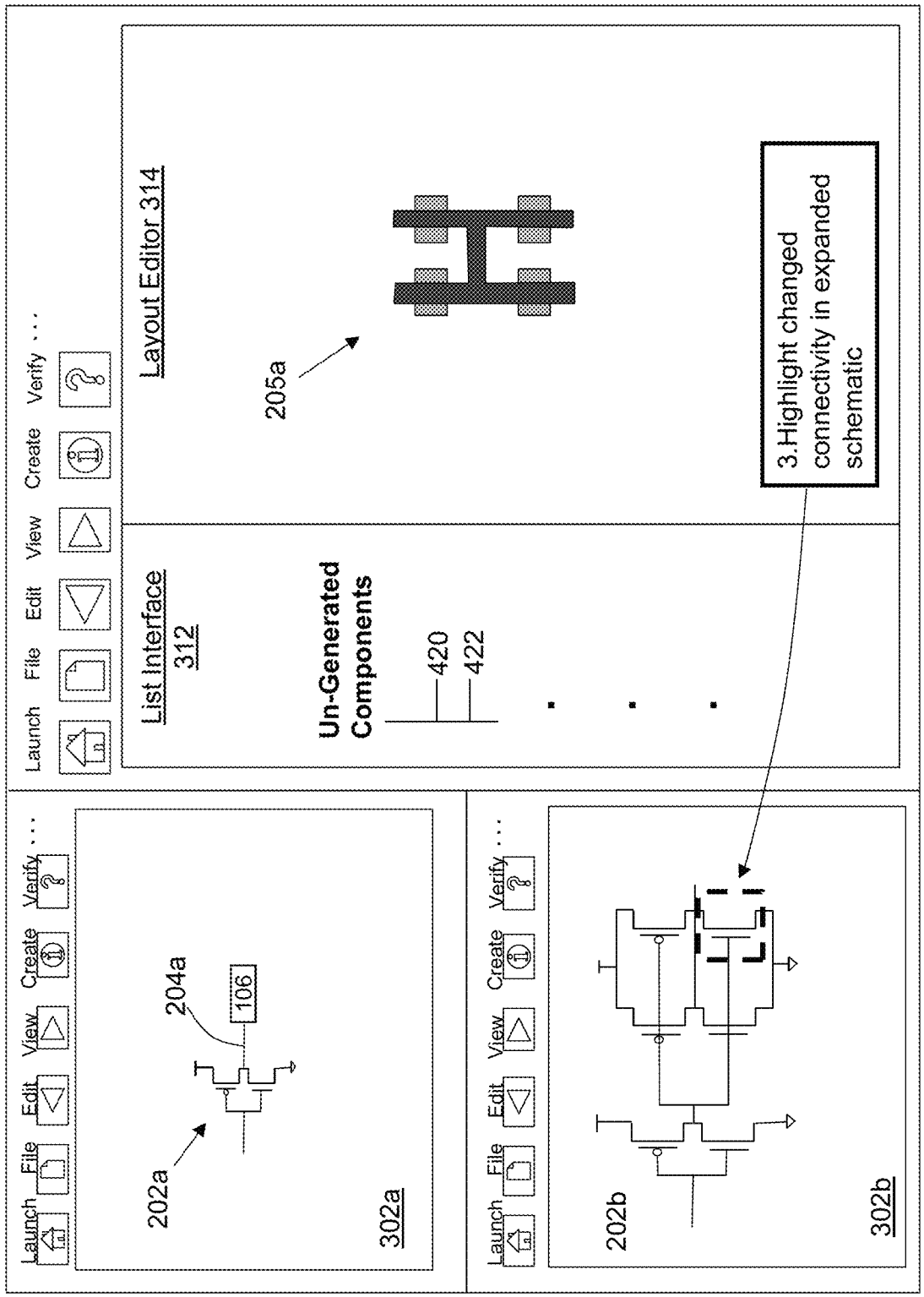

The user may choose to select one of the items from the list interface for highlighting. For example, as shown in FIG. 5B, the user may perform a selection of component 422 from the list view interface 122 (e.g., for newly added component 422). In response, as shown in FIG. 5C, the element of interest can be configured to be visually highlighted by manipulating the schematic interface display 302b. This figure illustrates that the element of interest (symbol for part 206) in the new version of the schematic 202b is visually highlighted within the interface, e.g., adding a focus box around the element and/or using any other suitable approach to highlight some portion of the schematic. As shown in FIG. 5D, the updated version of the schematic 202b that includes the contents of the sub-schematic 2 could be presented to the user, and the specific device 422 selected by the user is then visually highlighted in the interface.

It is noted that displaying the layout is optional in some embodiments. This is because many schematic designers may not want to see the layout, and may only want to see the two schematics. Therefore, some embodiments will only display the multiple schematics in the user interface.

In some embodiments, if the layout is not available (e.g., not yet done or not shared with the schematic designer), then the system can be configured to generate (e.g., on the fly) a connectivity correct layout. For example, random placement with no routing may be employed to generate a connectivity correct layout.

This approach provides numerous advantages for the layout designer. By including multiple schematic view interfaces, this permits highlighting of any element within the old and new schematics that may be of interest to the user, particularly elements that correspond to substantive changes as identified from an LVS check. In addition, this approach permits the layout designer to visually see the differences that were made to the schematic regardless of whether components are added or deleted or when the schematic is otherwise modified. While the illustrative examples are shown in the context of a device being added or deleted, it is noted that the inventive concept disclosed herein is applicable to highlight any type of change that can be made to a schematic. For example, the inventive concepts disclosed herein may be applied to highlight interconnect elements that are added or deleted from a schematic in addition to components. In addition, the inventive concepts disclosed herein may be applied to highlight any parameter changes that may be implemented for any elements within a schematic.

Figure 6:
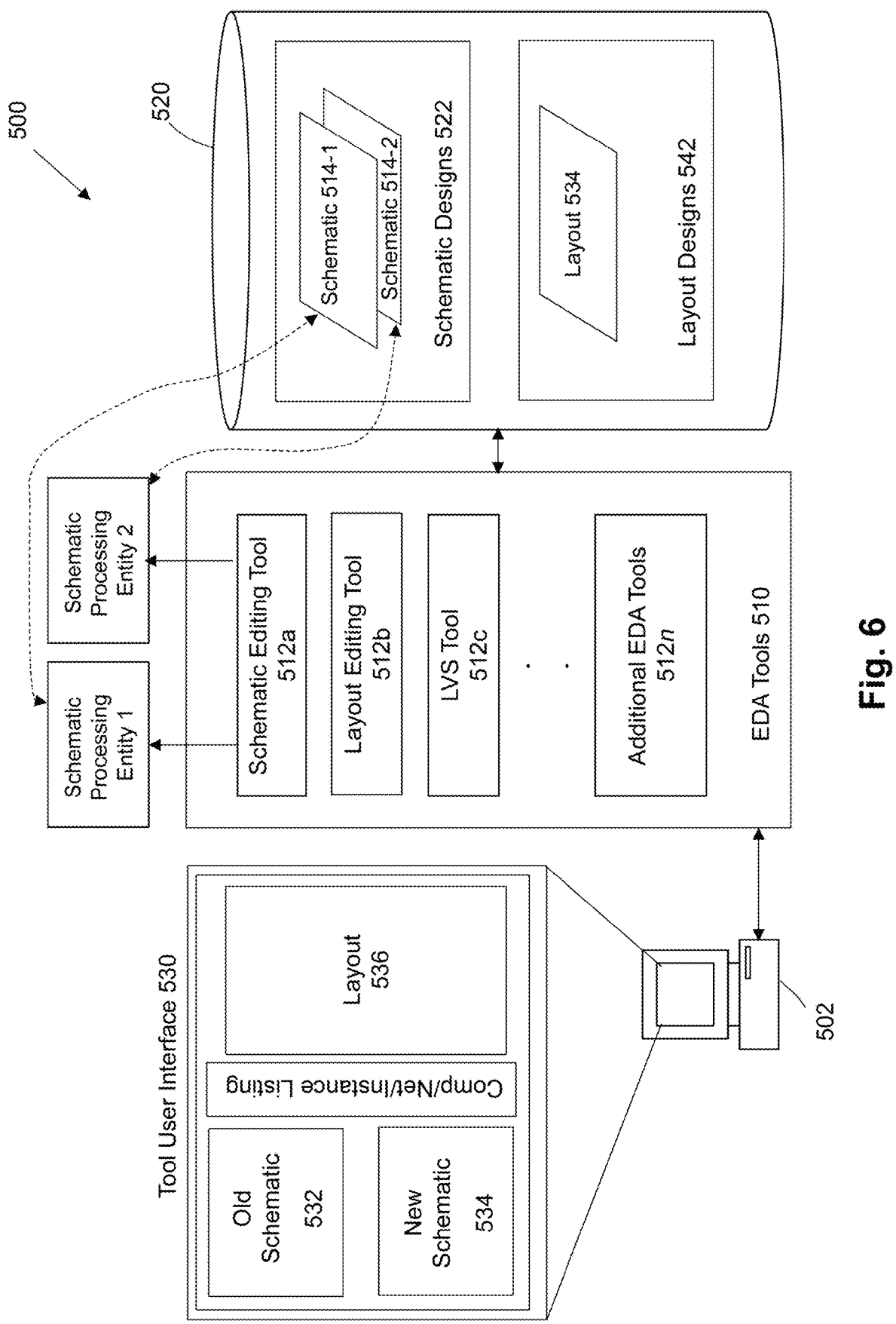
FIG. 6 illustrates an example system which may be employed in some embodiments of the invention to implement/edit a design layout.

FIG. 6 illustrates an example system 500 which may be employed in some embodiments of the invention to implement/edit a design layout. System 500 includes one or more users at one or more user stations 502 that operate the system 500 to design or edit electronic designs. Such users include, for example, design engineers or verification engineers. User station 502 comprises any type of computing station that may be used to operate, interface with, or implement EDA applications/tools 510 that operate on a user station, server, or as a cloud application. Examples of such user stations 502 include for example, workstations, personal computers, or remote computing terminals. User station 502 comprises a display device, such as a display monitor, for displaying electronic design schematics, layouts, and processing results to users at the user station 502. User station 502 also comprises one or more input devices for the user to provide operational control over the activities of system 500, such as a mouse or keyboard to manipulate a pointing object in a graphical user interface to generate user inputs.

The electronic design data may be stored in a computer readable storage device 520. Computer readable storage device 520 comprises any combination of hardware and software that allows for ready access to the data that is located at the computer readable storage device 520. For example, computer readable storage device 520 could be implemented as computer memory operatively managed by an operating system. The computer readable storage device 520 could also be implemented as an electronic database system having storage on persistent and/or non-persistent storage. The computer readable storage device 520 could also be implemented as storage located within a cloud-based storage system. The design data stored within storage device 520 may be organized using any suitable approach. For example, the OpenAccess, available from the OpenAccess Coalition, may be used as the standard for database access and storage technology for organization of the design data used within system 500.

One or more computer aided design (CAD) tools or EDA tools 510 may be implemented and used by users at a user station 502 to create or edit an electronic design. In embodiments of the invention, the EDA tools 510 include a schematic editing tool 512a, a layout editing tool 512b, and a LVS analysis tool 512c. Other and additional tools 512n may also be provided within system 500, including for example, additional electronic design simulation and verification tools.

To design an integrated circuit, a designer first creates high level behavior descriptions of the IC device using a high-level hardware design language. The EDA tools 510 may be used to receives the high level behavior descriptions of the IC device and translates this high-level design language into netlists of various levels of abstraction using a computer synthesis process. A netlist describes interconnections of nodes and components on the chip and includes information of circuit primitives such as transistors and diodes, their sizes and interconnections, for example. An integrated circuit designer may use a set of layout EDA application programs to create a physical integrated circuit design layout from a logical circuit design. After an integrated circuit designer has created an initial integrated circuit layout, the integrated circuit designer then verifies and optimizes the integrated circuit layout using a set of EDA testing and analysis tools. Verification may include, for example, design rule checking to verify compliance with rules established for various IC parameters. Typically, geometric information about the placement of the nodes and components onto the chip is determined by a placement process and a routing process. The placement process is a process for placing electronic components or circuit blocks on the chip and the routing process is the process for creating interconnections between the blocks and components according to the specified netlist. A layout file 534 is created from the placement and routing process, which assigns logic cells to physical locations in the device layout and routes their interconnections. The physical layout is typically described as many patterned layers, and the pattern of each layer is described by the union of a set of polygons. Component devices and interconnections of the integrated circuit are constructed layer by layer. A layer is deposited on the wafer and then it is patterned using a photolithography process and an etch process. One or more photomasks may then be created from the layout file for the photolithography of each layer. Photomasks are used to transfer the layout pattern onto the physical layer on the wafer. A photomask, or mask, provides an image of the desired physical geometries of the respective integrated circuit layer. Passing light through the mask projects the layout pattern for the layer onto the wafer. An imaging lens system projects and focuses the layout onto the substrate. The projected light pattern interacts with a photosensitive resist coating on the wafer and, resist portions that are exposed to light are rendered either soluble or insoluble in a developer solution, depending on the type of the photoresist. Accordingly, the mask pattern is transferred into the photo-resist by optical projection and chemical reactions. The photo-resist pattern is subsequently transferred to an underlying layer by an etch process. Most commonly, plasma containing chemically-selective reactive ions is used to etch high-aspect ratio trenches and holes with close to vertical sidewalls.

The EDA tools may present a user interface 530 that is displayed and interactively operated by a user at user station 502. The user interface 530 may include a layout editor interface 536, which is used to control and operate the actions of the layout editor 512b to create or edit a layout file 534 within layout design database (DB) 542.

The user interface 530 may also include multiple schematic editor interfaces. Here, the user interface includes a first schematic interface 532 to display an older version of a schematic and a second schematic interface 534 to display a newer version of a schematic. While only two schematic interfaces are shown in this figure, it is noted that embodiments of the invention may deploy any number of schematic interfaces as desired to display any number of schematic versions.

Within the system 500, a separate processing entity may be employed to implement each schematic interface. For example, system 500 may instantiate a first process 1 for the schematic editor 512a to implement the first schematic interface 532, while simultaneously instantiating a second process 2 for the schematic editor 512a to implement the second schematic interface 534. Each would run as a separate and distinct process that operates upon its own respective schematic version (514-1 or 514-2) within the database of schematic designs 522. It is noted that any suitable type of processing entity may be employed within the system. While the example is described in the context of using a process as a processing entity, other types of processing entities may also be used to implement each instance of the schematic editor. For example, other types of processing entities that may be employed include threads, virtual machines, and containers.

Figure 7:
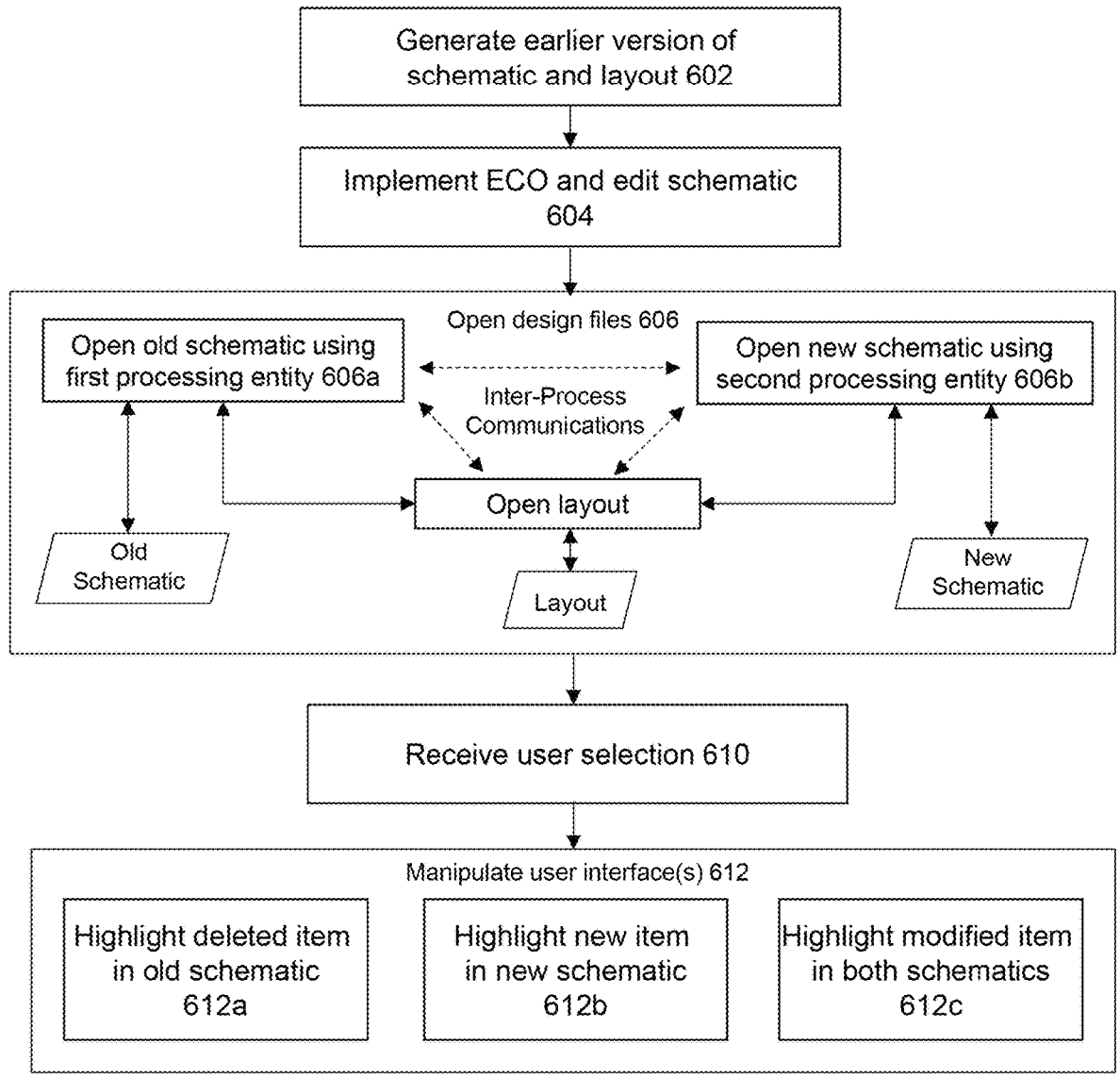
FIG. 7 shows a flowchart of an approach to implement some embodiments of the invention.

FIG. 7 shows a flowchart of an approach to implement some embodiments of the invention. At 602, an earlier version of a schematic and a layout is generated by one or more EDA tools within the system. The schematic may be created by a schematic designer and the layout may be created by a layout designer using the schematic. LVS processing may also be performed to verify that the contents of the schematic matches the contents of the layout.

At 604, an ECO may be implemented by editing the earlier version of the schematic to create a revised version of the schematic. The revised schematic may include any suitable type of change to the schematic. For example, the revised schematic may include the addition of one or more elements, removal of one or more elements, or the change to one or more parameters for elements within the design.

The updated schematic may then be used by the layout designer to edit the earlier layout. At 606, the layout designer may open the relevant design files. With embodiments of the invention, multiple processes are employed to open respective schematic versions. At 606a, a first process is used to open the earlier version of the schematic and create a first binding session for the earlier schematic relative to the earlier version of the layout. At 606b, a second process is used to open the newer version of the schematic and create a second binding session of the new schematic relative to the earlier version of the layout.

Coordination is performed between the multiple processes that have opened the different sessions relative to the different schematic versions. Inter-process communications (IPC) may be used to implement the coordination between the various processes. Any suitable type of type of IPC mechanism may be employed to implement cooperation between the different schematic processes. For example, message passing and/or memory sharing may be used to coordinate the activities between the multiple processes that handle the different schematic views.

At 610, a user selection may be received by the system from the user/designer that is operating the EDA tools. The user selection may be to select one or more items from a list view that is presented to the user. For example, a list view may be presented that identifies un-bound or un-generated elements within the layout, e.g., based upon an LVS analysis.

At 612, the user interfaces are manipulated to provide a visual indication of a change that occurred to the schematic based upon the user selection. In operation, the user selection is used by the system to identify an element identifier within the schematic(s). That element identifier is provided to and used by each of the schematic processes. Each of the schematic processes separately determines, in parallel, whether the identified element exists within the respective schematic. If so, then that schematic process will highlight the identified element, e.g., by drawing a visual box around the element or using any other suitable type of highlighting to focus on the element.

Different types of manipulations may occur based upon the type of change that has occurred to the schematic. If an item has been deleted from the schematic, then that item is likely to only exist in the old schematic but not the new schematic. Therefore, at 612a, the deleted item is highlighted in the old schematic. If an item has been added to the schematic, then that item is likely to only exist in the new schematic but not the old schematic. Therefore, at 612b, the added item is highlighted in the new schematic. If an existing item is modified but not deleted from the schematic, then that item is likely to exist in both the old and new schematics. Therefore, at 612c, the modified item can be highlighted in both the old and new schematics.

Therefore, what has been disclosed above is an improved method and system for visualizing schematic changes for an electronic design, where multiple schematic view interfaces are provided such that a first schematic interface displays an older schematic version and a second schematic interface displays a newer schematic version. Coordination is performed between the multiple schematic views such that an element within any of the first or second schematic views is appropriately highlighted based upon a user input. An LVS check can be performed to identify and facilitate visual highlighting of the pertinent changes between the old and new schematics. This approach is extremely beneficial since, by including multiple schematic view interfaces, this permits the layout designer to visually see the differences that were made to the schematic regardless of whether schematic elements are added, deleted, and/or modified.

System Architecture Over View

Figure 8:
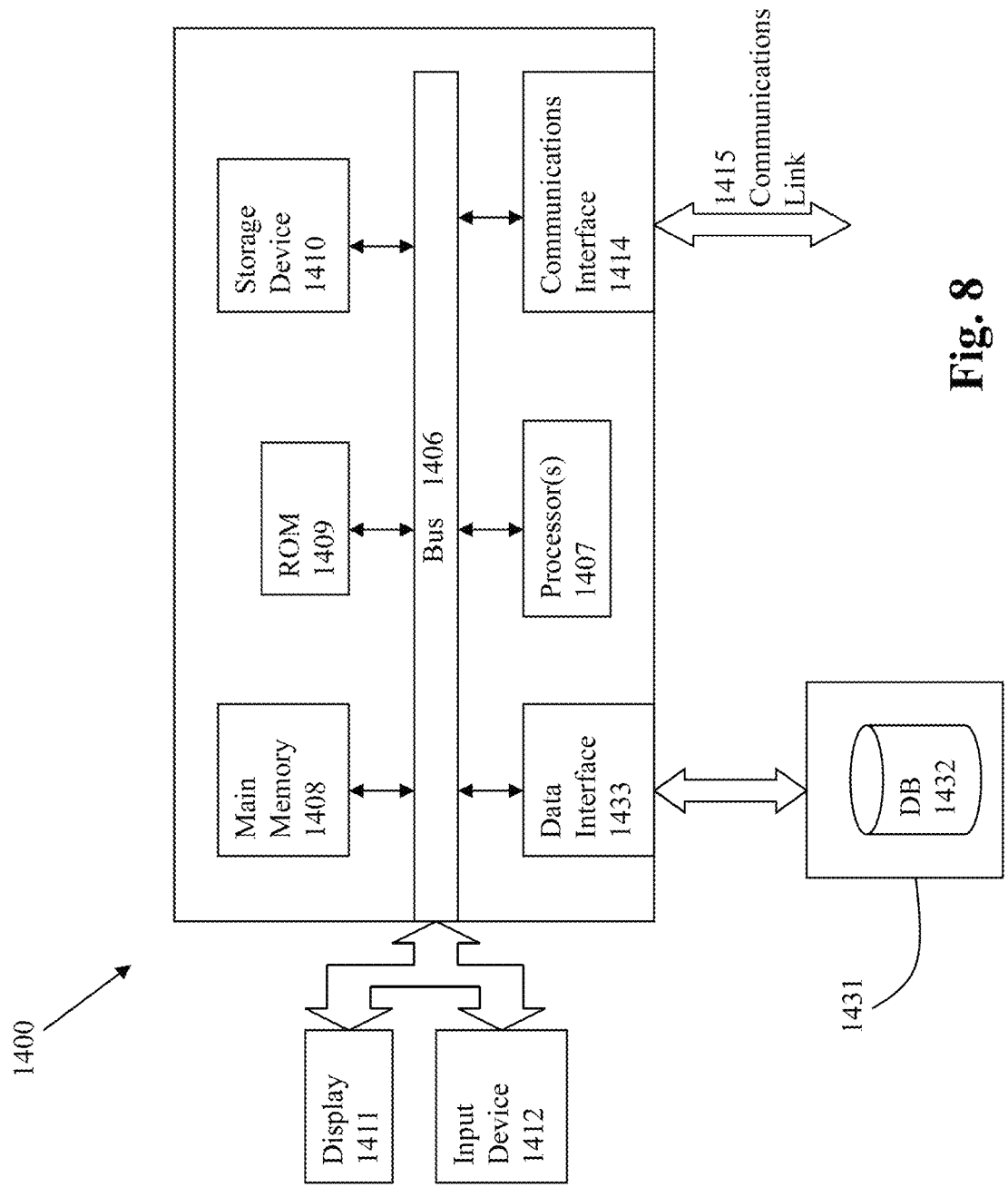
FIG. 8 shows an architecture of an example computing system with which the invention may be implemented.

FIG. 8 is a block diagram of an illustrative computing system 1400 suitable for implementing an embodiment of the present invention. Computer system 1400 includes a bus 1406 or other communication mechanism for communicating information, which interconnects subsystems and devices, such as processor 1407, system memory 1408 (e.g., RAM), static storage device 1409 (e.g., ROM), disk drive 1410 (e.g., magnetic or optical), communication interface 1414 (e.g., modem or Ethernet card), display 1411 (e.g., CRT or LCD), input device 1412 (e.g., keyboard), and cursor control.

According to one embodiment of the invention, computer system 1400 performs specific operations by processor 1407 executing one or more sequences of one or more instructions contained in system memory 1408. Such instructions may be read into system memory 1408 from another computer readable/usable medium, such as static storage device 1409 or disk drive 1410. In alternative embodiments, hard-wired circuitry may be used in place of or in combination with software instructions to implement the invention. Thus, embodiments of the invention are not limited to any specific combination of hardware circuitry and/or software. In one embodiment, the term "logic" shall mean any combination of software or hardware that is used to implement all or part of the invention.

The term "computer readable medium" or "computer usable medium" as used herein refers to any medium that participates in providing instructions to processor 1407 for execution. Such a medium may take many forms, including but not limited to, non-volatile media and volatile media. Non-volatile media includes, for example, optical or magnetic disks, such as disk drive 1410. Volatile media includes dynamic memory, such as system memory 1408.

Common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer can read.

In an embodiment of the invention, execution of the sequences of instructions to practice the invention is performed by a single computer system 1400. According to other embodiments of the invention, two or more computer systems 1400 coupled by communication link 1415 (e.g., LAN, PTSN, or wireless network) may perform the sequence of instructions required to practice the invention in coordination with one another. Data may be accessed on a database 1432 on a storage device 1432 through a data interface 1433.

Computer system 1400 may transmit and receive messages, data, and instructions, including program, i.e., application code, through communication link 1415 and communication interface 1414. Received program code may be executed by processor 1407 as it is received, and/or stored in disk drive 1410, or other non-volatile storage for later execution.

In the foregoing specification, the invention has been described with reference to specific embodiments thereof. It will, however, be evident that various modifications and changes may be made thereto without departing from the broader spirit and scope of the invention. For example, the above-described process flows are described with reference to a particular ordering of process actions. However, the ordering of many of the described process actions may be changed without affecting the scope or operation of the invention. The specification and drawings are, accordingly, to be regarded in an illustrative rather than restrictive sense.

The invention claimed is:

1. A computer implemented method implemented with a processor, the method comprising:
   generating a user interface having a first portion for a first version of a schematic for an electronic design, a second portion for a second version of a schematic for the electronic design, and a third portion for a layout for the electronic design;
   performing a layout versus schematic (LVS) analysis between the layout and the second version of the schematic for the electronic design;
   receiving a selection that corresponds to a changed element identified by the LVS analysis; and
   selectively highlighting the changed element in at least one of a first schematic view that displays the first version of the schematic or a second schematic view that displays the second version of the schematic.

2. The method of claim 1, in which the first version of the schematic corresponds to a first configuration rule for a symbol in the schematic and the second version of the schematic corresponds to a second configuration rule for the symbol, wherein the symbol is resolved according to the second configuration rule before performing the LVS analysis.

3. The method of claim 2, wherein the symbol is resolved according to the second configuration rule to associate the symbol with a sub-schematic.

4. The method of claim 1, in which a first processing entity implements the first schematic view that displays the first version of the schematic and a second processing entity implements the second schematic view that displays the second version of the schematic.

5. The method of claim 4, wherein the layout corresponds to the first version of the schematic, and both the first schematic view and the second schematic view are tied to the layout.

6. The method of claim 1, wherein a list interface is displayed that visually presents the changed element in the list interface.

7. The method of claim 6, wherein the changed element is identified in the list interface based at least upon operation of LVS (layout versus schematic) processing, and the list interface identifies at least one of an un-bound marker or an un-generated marker.

8. A computer program product embodied on a non-transitory computer readable medium, the non-transitory computer readable medium having stored thereon a sequence of instructions which, when executed by a processor causes the processor to execute a method, the method comprising:
   generating a user interface having a first portion for a first version of a schematic for an electronic design, a second portion for a second version of a schematic for the electronic design, and a third portion for a layout for the electronic design;
   performing a layout versus schematic (LVS) analysis between the layout and the second version of the schematic for the electronic design;
   receiving a selection that corresponds to a changed element identified by the LVS analysis; and
   selectively highlighting the changed element in at least one of a first schematic view that displays the first version of the schematic or a second schematic view that displays the second version of the schematic.

9. The computer program product of claim 8, in which the first version of the schematic corresponds to a first configuration rule for a symbol in the schematic and the second version of the schematic corresponds to a second configuration rule for the symbol, wherein the symbol is resolved according to the second configuration rule before performing the LVS analysis.

10. The computer program product of claim 9, wherein the symbol is resolved according to the second configuration rule to associate the symbol with a sub-schematic.

11. The computer program product of claim 8, in which a first processing entity implements the first schematic view that displays the first version of the schematic and a second processing entity implements the second schematic view that displays the second version of the schematic.

12. The computer program product of claim 11, wherein the layout corresponds to the first version of the schematic, and both the first schematic view and the second schematic view are tied to the layout.

13. The computer program product of claim 8, wherein a list interface is displayed that visually presents the changed element in the list interface.

14. The computer program product of claim 13, wherein the changed element is identified in the list interface based at least upon operation of LVS (layout versus schematic) processing, and the list interface identifies at least one of an un-bound marker or an un-generated marker.

15. A system, comprising:
a processor;
a memory for holding programmable code; and
wherein the programmable code includes instructions for generating a user interface having a first portion for a first version of a schematic for an electronic design, a second portion for a second version of a schematic for the electronic design, and a third portion for a layout for the electronic design; performing a layout versus schematic (LVS) analysis between the layout and the second version of the schematic for the electronic design;
receiving a selection that corresponds to a changed element identified by the LVS analysis; and selectively highlighting the changed element in at least one of a first schematic view that displays the first version of the schematic or a second schematic view that displays the second version of the schematic.

16. The system of claim 15, in which the first version of the schematic corresponds to a first configuration rule for a symbol in the schematic and the second version of the schematic corresponds to a second configuration rule for the symbol, wherein the symbol is resolved according to the second configuration rule before performing the LVS analysis.

17. The system of claim 16, wherein the symbol is resolved according to the second configuration rule to associate the symbol with a sub-schematic.

18. The system of claim 15, in which a first processing entity implements the first schematic view that displays the first version of the schematic and a second processing entity implements the second schematic view that displays the second version of the schematic.

19. The system of claim 18, wherein the layout corresponds to the first version of the schematic, and both the first schematic view and the second schematic view are tied to the layout.

20. The system of claim 15, wherein a list interface is displayed that visually presents the changed element in the list interface.

21. The system of claim 20, wherein the changed element is identified in the list interface based at least upon operation of LVS (layout versus schematic) processing, and the list interface identifies at least one of an un-bound marker or an un-generated marker.

* * * * *